(12) United States Patent
DeSanti et al.

(10) Patent No.: US 12,481,466 B2
(45) Date of Patent: Nov. 25, 2025

(54) MULTIPLE INDEPENDENT STORAGE FABRIC SAN SYSTEM

(71) Applicant: Dell Products L.P., Round Rock, TX (US)

(72) Inventors: Claudio DeSanti, Santa Cruz, CA (US); Erik P. Smith, Douglas, MA (US); Joseph Lasalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 18/171,741

(22) Filed: Feb. 21, 2023

(65) Prior Publication Data

US 2024/0281172 A1 Aug. 22, 2024

(51) Int. Cl.
*G06F 3/06* (2006.01)
(52) U.S. Cl.
CPC .......... *G06F 3/067* (2013.01); *G06F 3/0604* (2013.01); *G06F 3/0655* (2013.01)
(58) Field of Classification Search
CPC ...... G06F 3/067; G06F 3/0604; G06F 3/0655; H04L 67/1097; H04L 49/356
See application file for complete search history.

(56) References Cited

U.S. PATENT DOCUMENTS

| | | | | |
|---|---|---|---|---|
| 10,057,348 B2* | 8/2018 | Myrah | ............. | G06F 3/0611 |
| 10,216,423 B1* | 2/2019 | Malwankar | ............. | G06F 3/064 |
| 10,268,372 B2* | 4/2019 | Myrah | ............. | G06F 3/0635 |
| 11,182,325 B1* | 11/2021 | Frey | ............. | G06F 13/4027 |
| 11,218,391 B2* | 1/2022 | Singh | ............. | H04L 41/12 |
| 11,232,006 B2* | 1/2022 | Legtchenko | ............. | H04L 41/0889 |
| 11,311,114 B1* | 4/2022 | Fleisher | ............. | A47C 27/065 |
| 12,067,466 B2* | 8/2024 | Watkins | ............. | G06F 3/0658 |

* cited by examiner

*Primary Examiner* — Alex Tran
(74) *Attorney, Agent, or Firm* — Joseph Mencher

(57) ABSTRACT

A multiple independent storage fabric SAN system includes a storage system. A first storage fabric includes a first switch device that is directly connected to the storage system, and first host devices that are directly connected to the first switch device and each configured to transmit storage data traffic via the first switch device with the storage system. A second storage fabric is independent from the first storage fabric and includes a second switch device that is directly connected to the storage system and that is not configured to transmit storage data traffic with the first switch device, and second host devices that are directly connected to the second switch device and each configured to transmit storage data traffic via the second switch device with the storage system. The storage system is configured to provide first storage services to each of the first storage fabric and the second storage fabric.

20 Claims, 21 Drawing Sheets

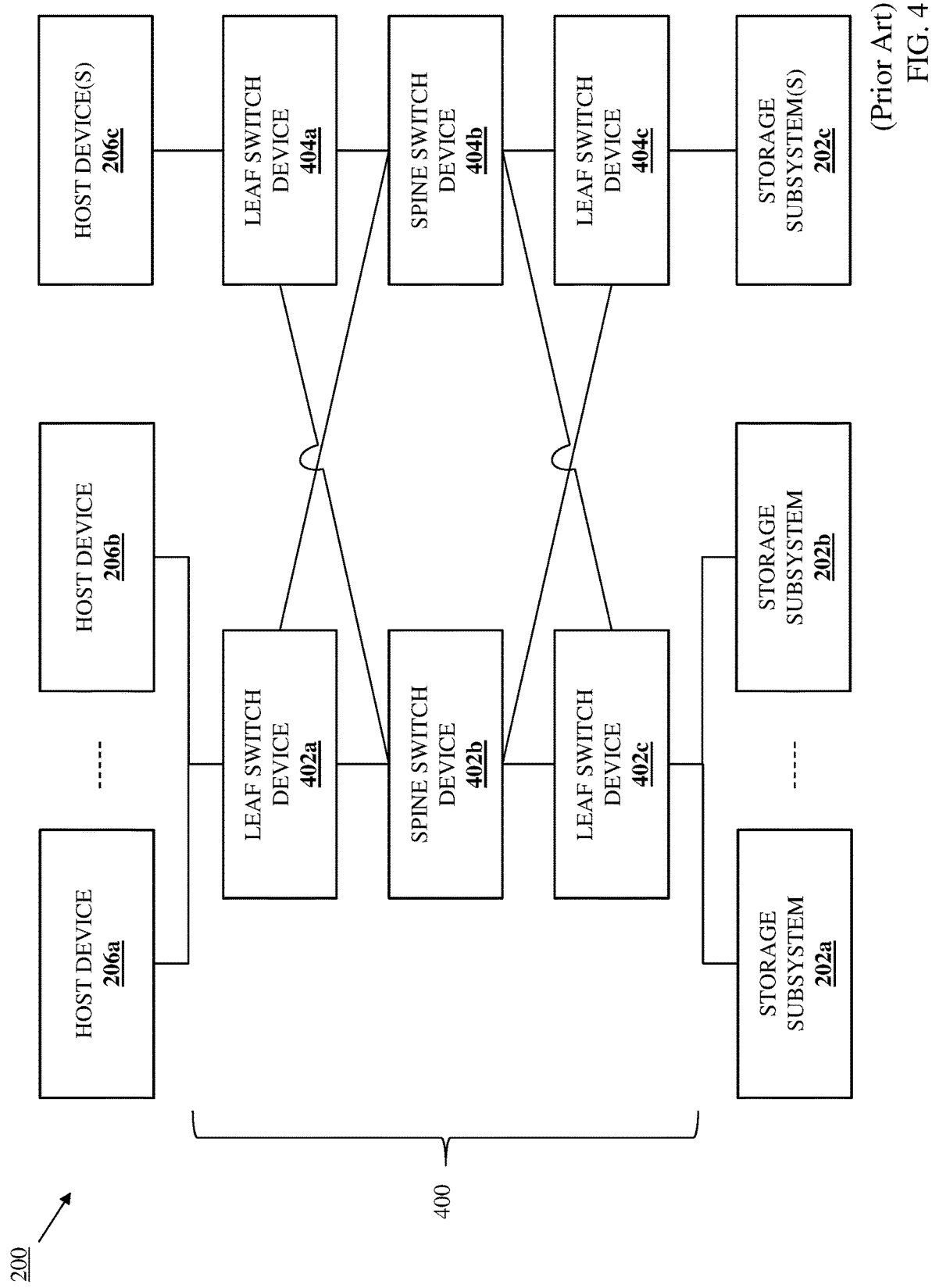
(Prior Art) FIG. 4

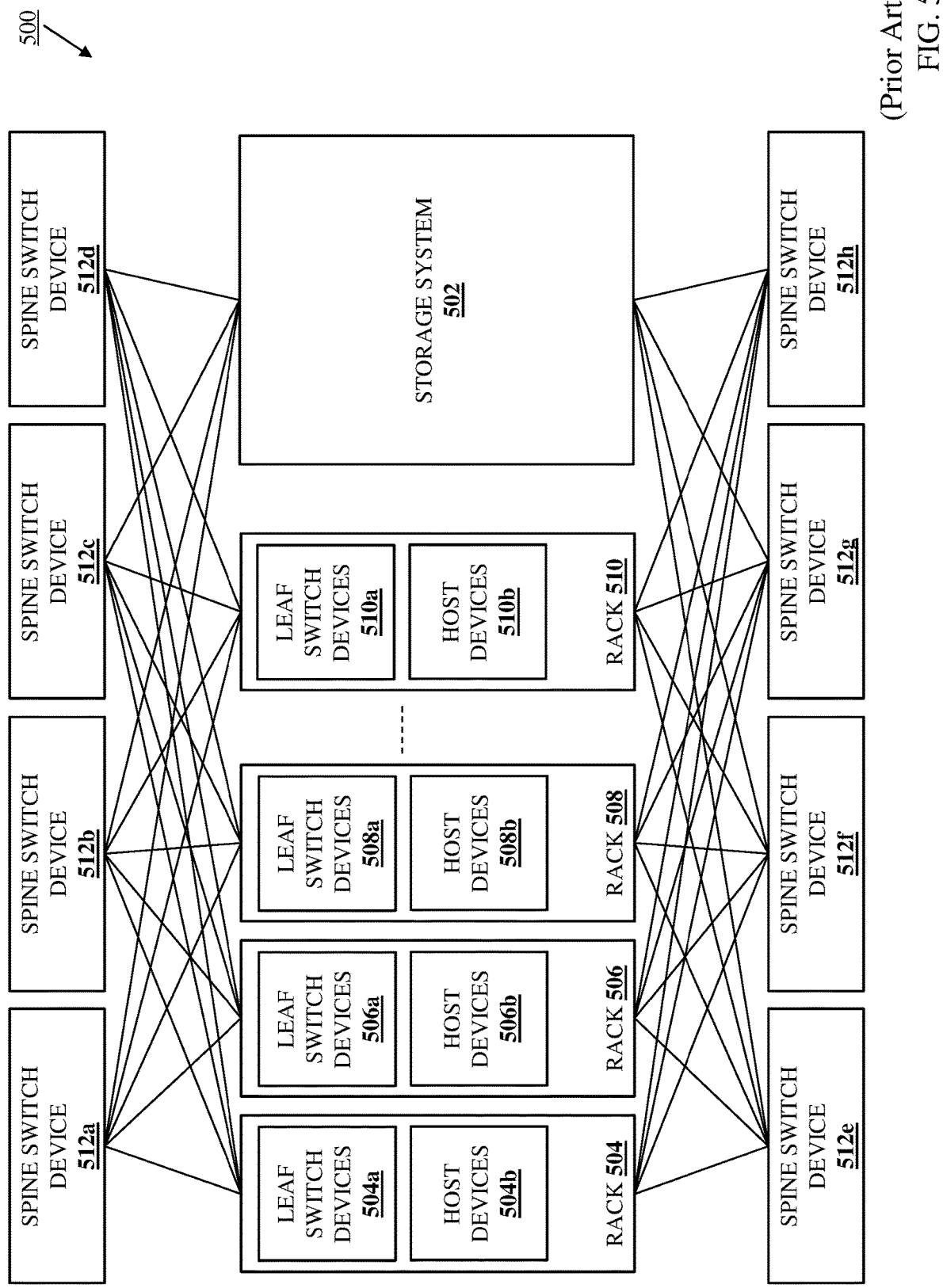
(Prior Art) FIG. 5

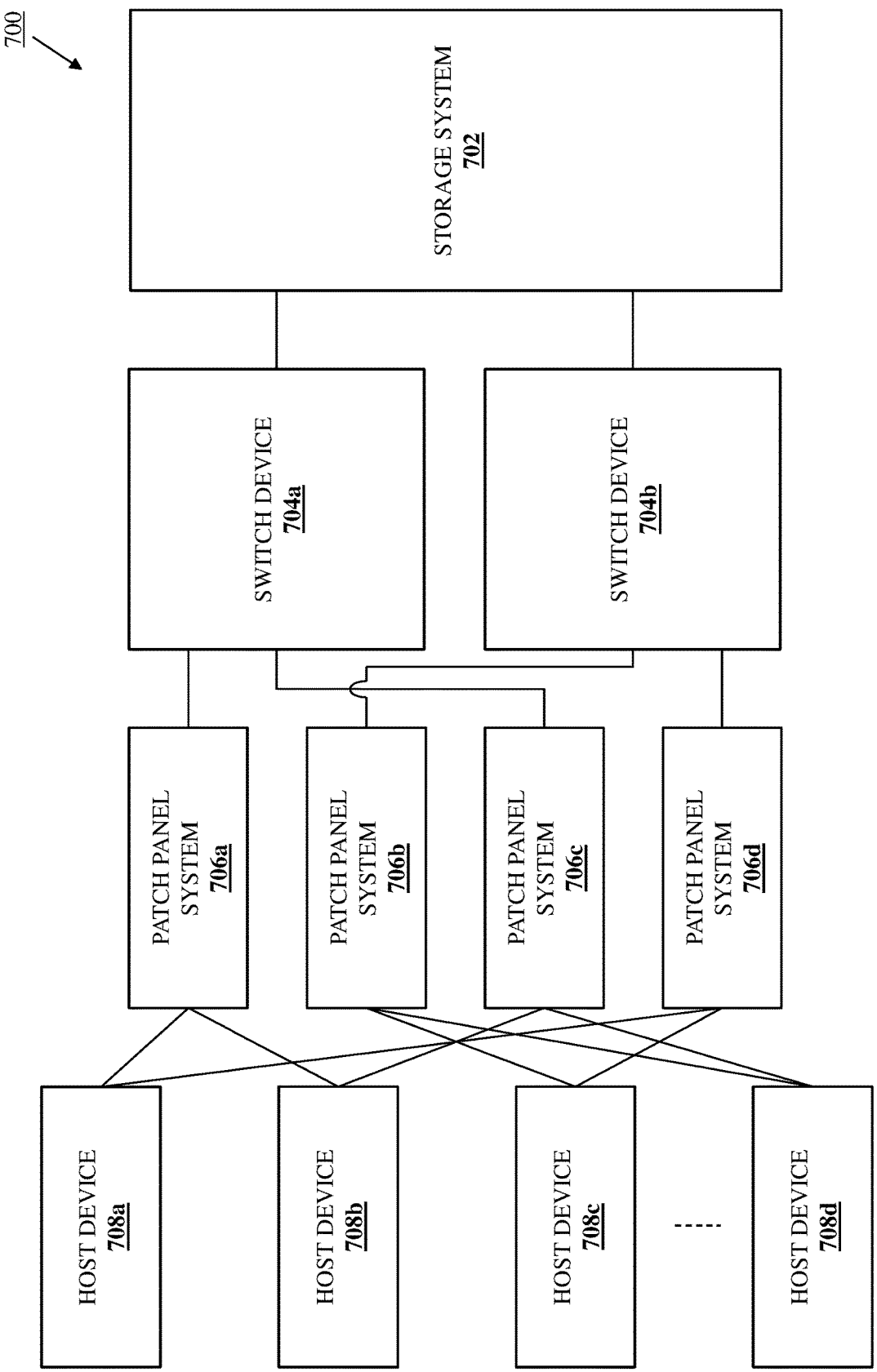
(Prior Art) FIG. 7

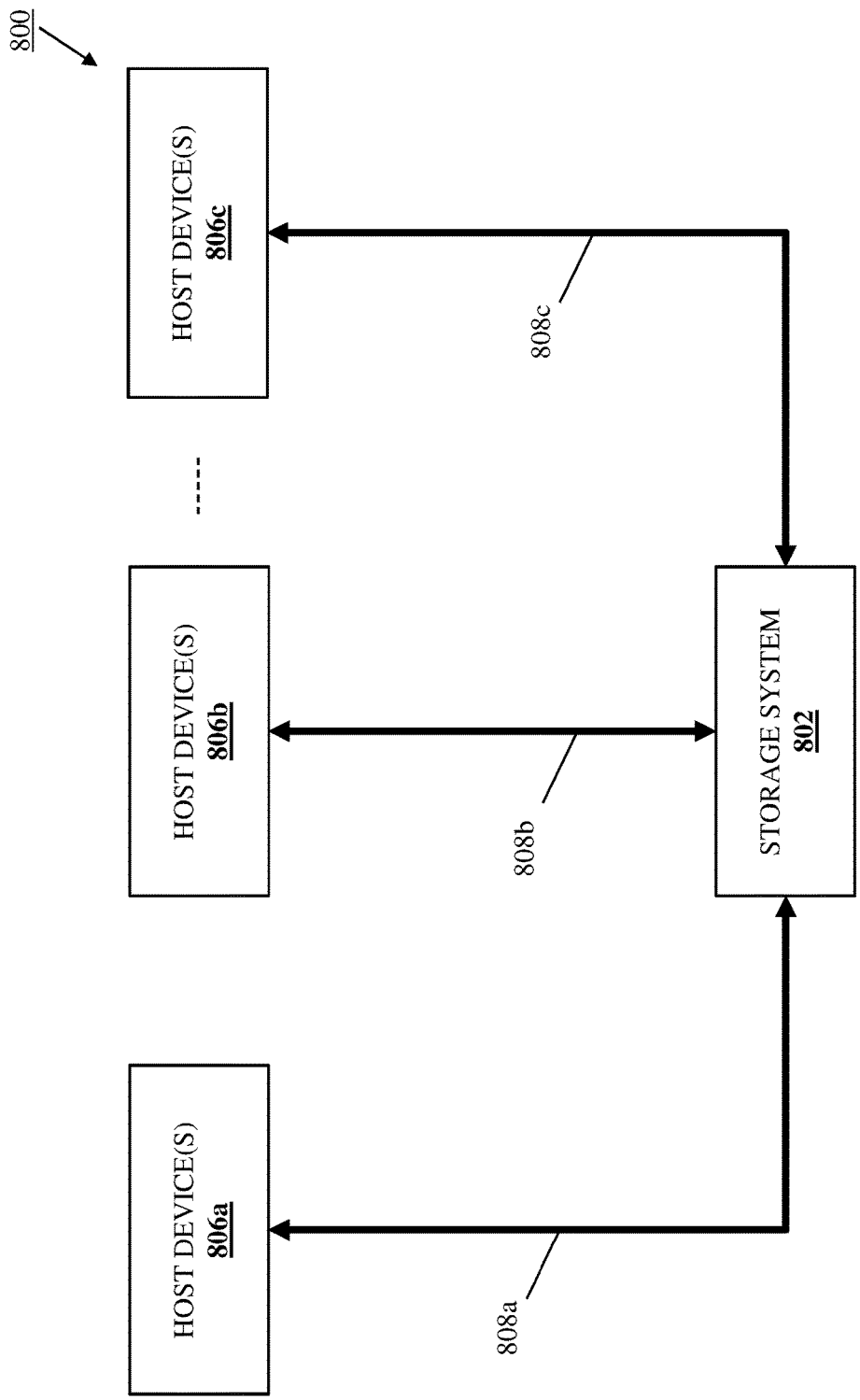

MULTIPLE INDEPENDENT STORAGE FABRIC SAN SYSTEM

BACKGROUND

The present disclosure relates generally to information handling systems, and more particularly to configuring information handling systems to provide multiple independent storage fabrics in a Storage Area Network (SAN).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage systems, switch devices, and/or other Storage Area Network (SAN) components, are sometimes used to provide SANs, which one of skill in the art in possession of the present disclosure will recognize are specialized networks dedicated to providing connectivity between the storage systems and host devices that provide hosts. SANS are typically designed to provide "any-to-any" connectivity between hosts and storage systems (e.g., such that any host in the SAN may potentially be allowed to connect to and communicate with one or more of the storage device included in any storage system in the SAN), and zoning techniques are then often used to allow connectivity between particular hosts and particular storage devices/storage systems (e.g., a first zone may allow first hosts to connecting to and communicating with first storage devices/a first storage system in the SAN, a second zone may allow second hosts to connecting to and communicating with second storage devices/a second storage system in the SAN, etc.) in order to, for example, provide security, define Quality of Service (QOS), constrain discovery operations, and/or provide other zoning benefits known in the art.

The SAN fabric in the SAN (e.g., provided by the switch devices discussed above) may be based on Fibre Channel technology, Ethernet technology, and/or other communications technologies known in the art, and may be configured as a "lossless" fabric that prevents the dropping of data frames/packets in the presence of congestion in the SAN fabric. However, as will be appreciated by one of skill in the art in possession of the present disclosure, such lossless fabrics can introduce issues such as "congestion spreading" and "head-of-line blocking" in the event of congestion when the SAN fabric. For example, a SAN fabric provided in a "spine-leaf" configuration may include "ingress" leaf switch devices (e.g., Top Of Rack (TOR) switch devices through which, from the point of view of a host, data frames/packets must flow from a storage device/storage system to reach the host) connected to subsets of the hosts, "egress" leaf switch devices (e.g., TOR switch devices through which, from the point of view of a host, data frames/packets must flow from the host to reach a storage device/storage system) connected to subsets of the storage devices, and one or more spine switch devices connecting the ingress leaf switch devices to the egress leaf switch devices, and such "spine-leaf" configurations may be particularly susceptible to the congestion issues discussed above.

For example, in the event of congestion in a first switch device in the SAN fabric, that first switch device may cause second switch devices or other connected devices to pause the sending of data to that first switch device until the congestion is gone. Furthermore, while a second switch/connected device is pausing the sending of data to the first switch device, that second switch/connected device may experience congestion and cause third switch/connected devices to pause the sending of data to that second switch/connected device until the congestion is gone, and that process can repeat across multiple switch/connected devices and result in the "congestion spreading" discussed above. Further still, while the congestion in any of the switch devices discussed above operates to pause data transmission by the switch/connected device causing that congestion, it can also block data transmission by switch/connected devices that are not causing that congestion and result in the "head-of-line blocking" discussed above. Finally, a data packet transmitted through SAN fabrics including the "spine-leaf" configuration discussed above will be processed via at least an Application Specific Integrated Circuit (ASIC) in the ingress leaf switch device, an ASIC in the spine switch device, and an ASIC in the egress leaf switch device, and the three (or more) queueing systems used with those ASICs introduce latency into the data packet transmission process.

One solution to the issues discussed above is to provide the SAN fabric in the SAN using a single "big" switch device to enable communications between the hosts and the storage systems. However, such "big" switch devices introduce other issues such as, for example, increased cabling requirements due to the relatively large number of cables that converge on and must be connected to that "big" switch device, as well as increased costs associated with the need to provide a fully redundant switch device for the "big" switch device in order to eliminate the "big" switch device as a single point of failure. Furthermore, such "big" switch devices are modular and include a plurality of port line cards and switch fabric cards to provide the connectivity discussed above. As such, similarly to the "spine-leaf" configuration discussed above, a data packet transmitted through a "big" switch device will be processed via at least an ingress port ASIC, a fabric ASIC, and an egress port ASIC, and the three (or more) queueing systems used with those ASICs introduce latency into the data packet transmission process.

Accordingly, it would be desirable to provide a SAN system that addresses the issues discussed above.

SUMMARY

According to one embodiment, an Information Handling System (IHS) includes a chassis; a communication system that is included on the chassis and that is: directly connected to a first switch device that is directly connected to a plurality of first host devices to provide a first storage fabric;

and directly connected to a second switch device that is not configured to transmit storage data traffic with the first switch device, and that is directly connected to a plurality of second host devices to provide a second storage fabric that is independent from the first storage fabric; a plurality of storage devices that are housed in the chassis; a processing system that is included in the chassis and coupled to each of the communication system and the plurality of storage devices; and a memory system that is included in the chassis, coupled to the processing system, and that includes instructions that, when executed by the processing system, cause the processing system to provide a storage engine that is configured to: transmit storage data traffic associated with the plurality of storage devices via the first switch device with each of the plurality of first host devices; transmit storage data traffic associated with the plurality of storage devices via the second switch device with each of the plurality of second host devices; and provide storage services to each of the first storage fabric and the second storage fabric.

BRIEF DESCRIPTION OF THE DRAWINGS

FIG. 4 is a schematic view illustrating an embodiment of a configuration of a SAN fabric in the conventional SAN of FIG. 2.

FIG. 5 is a schematic view illustrating an embodiment of a real-world configuration of the conventional SAN of FIG. 4.

FIG. 7 is a schematic view illustrating an embodiment of a real-world configuration of the conventional SAN of FIG. 6.

FIG. 8C is a schematic view illustrating an embodiment of connectivity enabled by the SAN of FIG. 8A.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
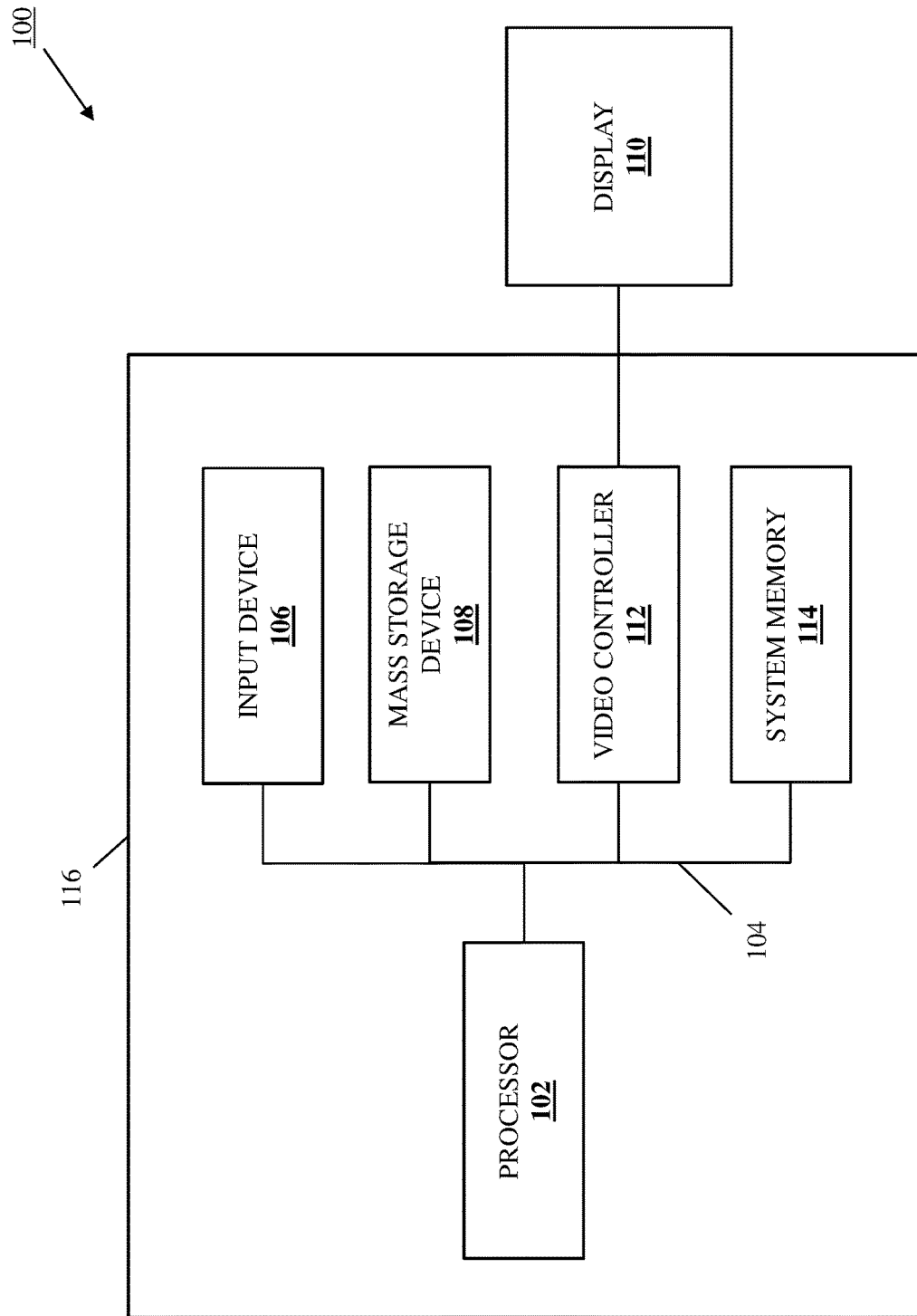
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
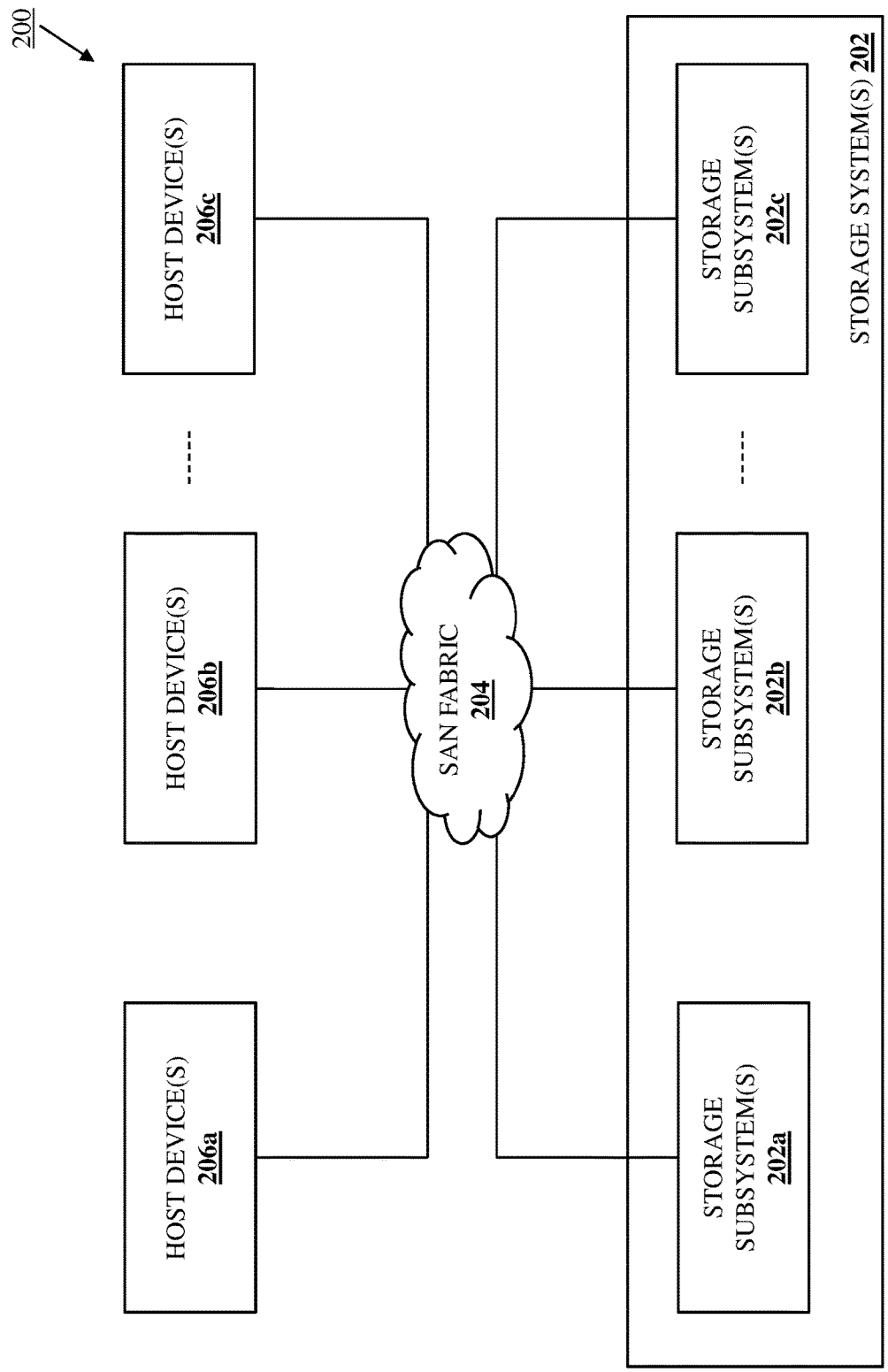
FIG. 2 is a schematic view illustrating an embodiment of a conventional SAN.

Referring now to FIG. 2, an embodiment of a conventional SAN 200 is illustrated for purposes of comparison to the multiple independent storage fabric SAN system of the present disclosure. In the illustrated embodiment, the conventional SAN 200 includes one or more storage systems 202 having one or more storage subsystems 202a, one or more storage subsystems 202b, and up to one or more storage subsystems 202c, and one of skill in the art in possession of the present disclosure will appreciate how any of the storage subsystems 202a-202c may be provided by storage devices and/or other storage subsystems known in the art. As illustrated, the storage subsystems 202a-202c may be coupled via a SAN fabric 204 to one or more host devices 206a, one or more host devices 206b, and up to one or more host devices 206c, and one of skill in the art in possession of the present disclosure will appreciate how any of the host devices may be provided by server devices that are configured to provide hosts, as well as any other host devices that one of skill in the art in possession of the present disclosure would recognize as being capable of providing hosts. As discussed above, the conventional SAN 200 is designed to provide "any-to-any" connectivity between the host devices 206a-206c and the storage subsystems 202a-202c (e.g., such that any host device 206a-206c in the conventional SAN 200 may connect to and communicate with any storage subsystem 202a-202c included in any storage system 202 in the conventional SAN 200).

Figure 3A:
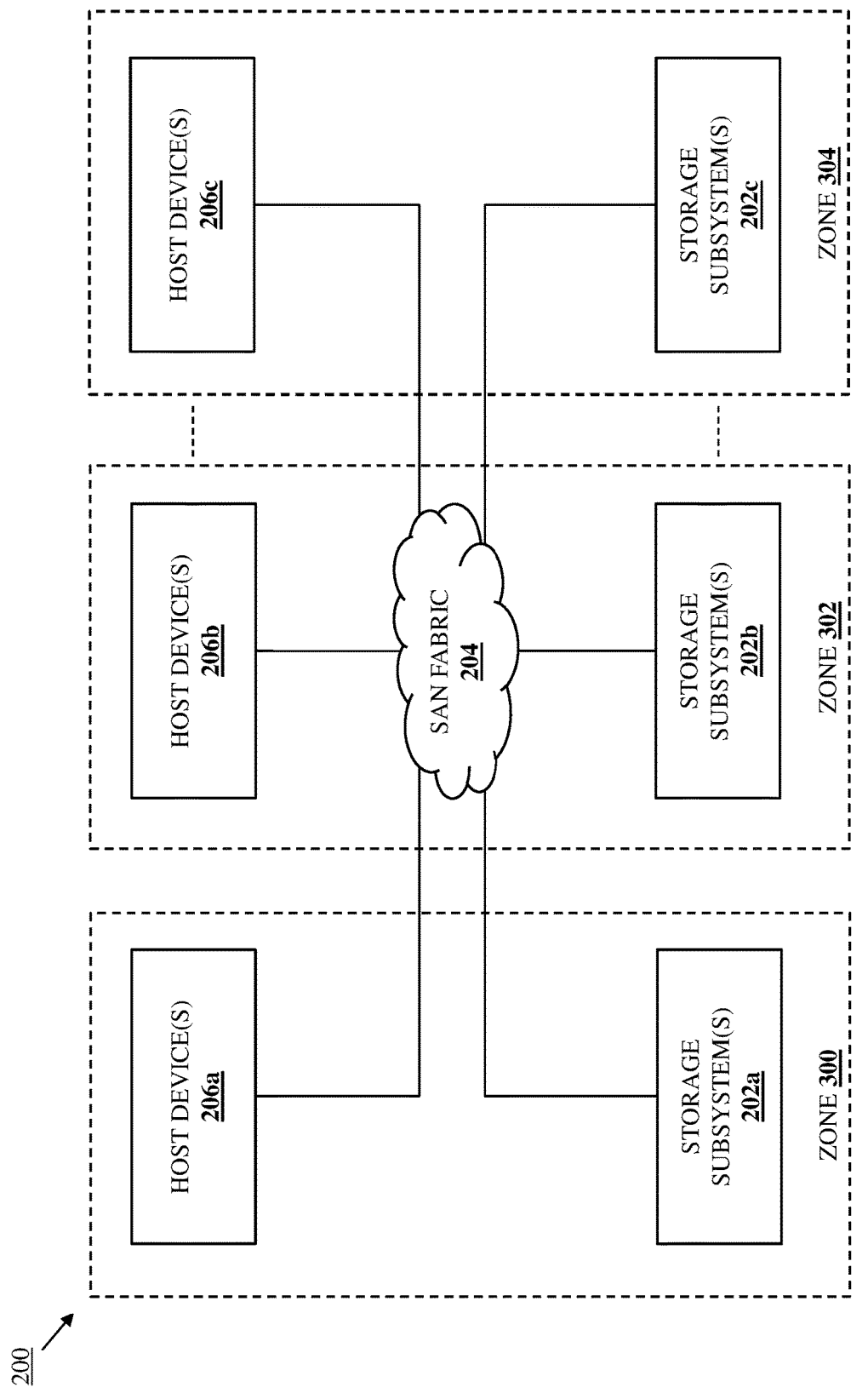
FIG. 3A is a schematic view illustrating an embodiment of zones provided in the conventional SAN of FIG. 2.
Figure 3B:
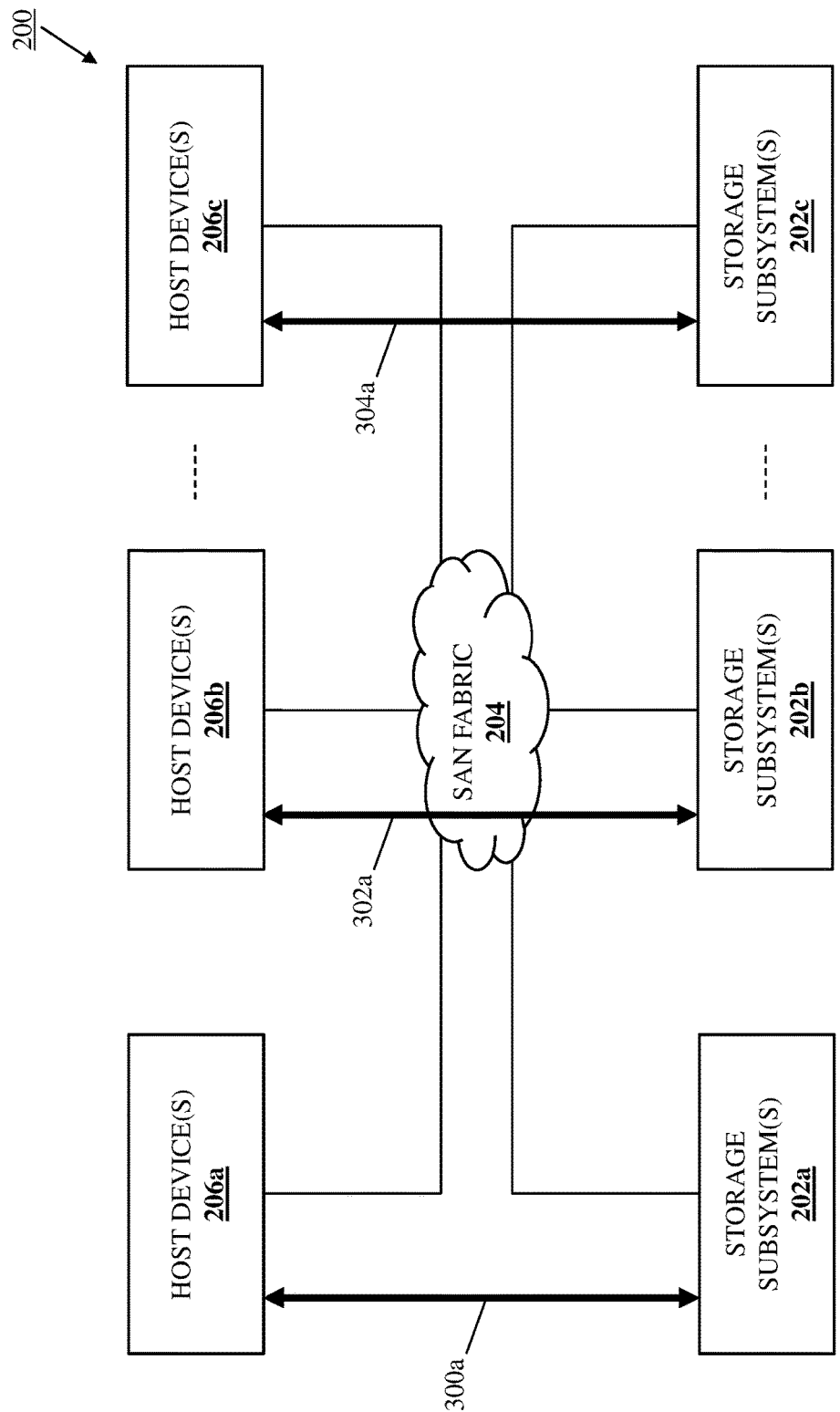
FIG. 3B is a schematic view illustrating an embodiment of connectivity enabled via the zones provided in the conventional SAN of FIG. 3A.

As also discussed above, zones are then provided in the conventional SAN 200 in order to, for example, provide security (e.g., to ensure particular host devices cannot access particular storage subsystems), define Quality of Service (QOS) (e.g., ensure the network provides adequate bandwidth between host devices and storage subsystems), constrain discovery operations (e.g., limit host devices to discovering and logging into storage subsystems they will actually use), and/or provide other zoning benefits known in the art. For example, with reference to FIGS. 3A and 3B, a zone 300 may be provided that includes the host device(s) 206a and the storage subsystem(s) 202a in order to restrict connectivity 300a for the host device(s) 206a to the storage subsystem(s) 202a, a zone 302 may be provided that includes the host device(s) 206b and the storage subsystem(s) 202b in order to restrict connectivity 302a for the host device(s) 206b to the storage subsystem(s) 202b, and a zone 304 may be provided that includes the host device(s) 206c and the storage subsystem(s) 202c in order to restrict connectivity 304a for the host device(s) 206c to the storage subsystem(s) 202c.

Referring to FIG. 4, an embodiment of a spine-leaf configuration of a simplified SAN fabric 400 in the conventional SAN 200 discussed above with reference to FIG. 2 is illustrated, and one of skill in the art in possession of the present disclosure will appreciate how the SAN fabric 204 of the conventional SAN 200 discussed above with reference to FIGS. 2, 3A, and 3B may be provided by the SAN fabric 400. As illustrated, the host devices 206a and up to 206b may each be connected to a leaf switch device 402a in the SAN fabric 400, a spine switch device 402b in the SAN fabric 400 may be connected to the leaf switch device 402a, and a leaf switch device 402c in the SAN fabric 400 may be connected to the spine switch device 402b and each of the storage subsystems 202a and up to 202b. Furthermore, the host device(s) 206c may each be connected to a leaf switch device 404a in the SAN fabric 400, a spine switch device 404b in the SAN fabric 400 may be connected to the leaf switch device 404a, and a leaf switch device 404c in the SAN fabric 400 may be connected to the spine switch device 404b and each of the storage subsystem(s) 202c. Further still, the spine switch device 402b may be connected to each of the leaf switch devices 404a and 404c, and the spine switch device 404b may be connected to each of the leaf switch devices 402a and 402c.

As will be appreciated by one of skill in the art in possession of the present disclosure, spine-leaf configurations like the SAN fabric 400 in the conventional SAN 200 illustrated in FIG. 4 allow cabling of the conventional SAN 200 to be generally simplified. For example, the cabling connections between the host devices and leaf switch devices (e.g., the cabling connections between the host devices 206a-206b and a Top Of Rack (TOR) leaf switch device that provides the leaf switch device 402a, and the cabling connections between the host device(s) 206c and a TOR leaf switch device that provides the leaf switch device 404a) may be routed within a rack that houses each leaf switch device (e.g., either of the TOR leaf switch devices discussed above) and its connected host device(s). Furthermore, the cabling connections between the leaf switch devices and the spine switch devices (e.g., the cabling connections between the spine switch device 402b and each of the leaf switch devices 402a and 402c, and the cabling connections between the spine switch device 404b and each of the leaf switch devices 404a and 404c) may be routed between the racks that house the leaf switch devices and the rack(s) that house the spine switch devices. Further Still, one of skill in the art in possession of the present disclosure will appreciate how the leaf switch devices and spine switch devices used in spine-leaf configurations like the SAN fabric 400 in the conventional SAN 200 illustrated in FIG. 4 are relatively "small" and economic switch devices that enable the provisioning of relatively inexpensive SAN fabrics.

However, as discussed above, because SAN fabrics in conventional SANs may be configured as lossless fabrics that prevents the dropping of data frames/packets in the presence of congestion in the SAN fabric, spine-leaf configurations like the SAN fabric 400 in the conventional SAN 200 illustrated in FIG. 4 can introduce issues in the event of congestion. To provide a specific example, in the event of congestion in the spine switch device 402b in the SAN fabric 400, the spine switch device 402b may cause the leaf switch device 402a to pause the sending of data frames/packets to the spine switch device 402b until the congestion is gone. Furthermore, while the leaf switch device 402a is pausing the sending of data frames/packets to the spine switch device 402b, the leaf switch device 402a may experience congestion and cause the host devices 206a-206c to pause the sending of data frames/packets to the leaf switch device 402a until the congestion is gone, resulting in a phenomenon known as "congestion spreading". Further still, while the congestion in the leaf switch device 402a above operates to pause data frame/packet transmission by the host device 206a that may be causing that congestion in this example, it also blocks data frame/packet transmission by the host device 206b that may not be causing that congestion in this example, resulting in a phenomenon known as "head-of-line blocking".

Furthermore, as also discussed above, spine-leaf configurations like the SAN fabric 400 in the conventional SAN 200 illustrated in FIG. 4 introduce latency into the data transmission process. For example, a data frame/packet transmitted by the host device 206a and through the SAN fabric 400 will be processed by at least an Application Specific Integrated Circuit (ASIC) in the leaf switch device 402a, an ASIC in the spine switch device 402b, and an ASIC in the leaf switch device 402c, and the three (or more) queueing systems used with those ASICs introduce latency into the data packet transmission process.

Referring now to FIG. 5, an embodiment of a real-world configuration 500 of the conventional SAN 200 of FIG. 2 including the SAN fabric 400 of FIG. 4 is illustrated. As illustrated, the real-world configuration 500 includes a storage system 502 that may include any of the storage subsystems 202a-202c discussed above. The real-world configuration 500 also includes a rack 504 housing leaf switch devices 504a (e.g., a pair of redundant TOR leaf switch devices) connected to host devices 504b, a rack 506 housing leaf switch devices 506a (e.g., a pair of redundant TOR leaf switch devices) connected to host devices 506b (e.g., server devices), a rack 508 housing leaf switch devices 508a (e.g., a pair of redundant TOR leaf switch devices) connected to host devices 508b (e.g., server devices), and up to a rack 510 housing leaf switch devices 510a (e.g., a pair of redundant TOR leaf switch devices) connected to host devices 510b (e.g., server devices).

Furthermore, the real-world configuration 500 also includes spine switch devices 512a, 512b, 512c, and 512d that are each connected to the storage system 502 and at least one of each of the leaf switch devices 504a, 506a, 508a, and 510a in the racks 504, 506, 508, and 510, respectively. Further still, the real-world configuration 500 also includes spine switch devices 512e, 512f, 512g, and 512h that are each connected to the storage system 502 and at least one of each of the leaf switch devices 504a, 506a, 508a, and 510a in the racks 504, 506, 508, and 510, respectively. One of skill in the art in possession of the present disclosure will appreciate how the spine switch devices 512a-512d and the spine switch devices 512e-512h operate to provide redundant connections to the storage system 502 for the host devices 504b, 506b, 508b, and 510b in each of the racks 504, 506, 508, and 510, respectively, via each of their redundant leaf switch devices 504a, 506a, 508a, and 510a, respectively. As such, one of skill in the art in possession of the present disclosure will appreciate how the real-world configuration 500 of FIG. 5 provides both the benefits and introduces the issues discussed above.

Figure 6:
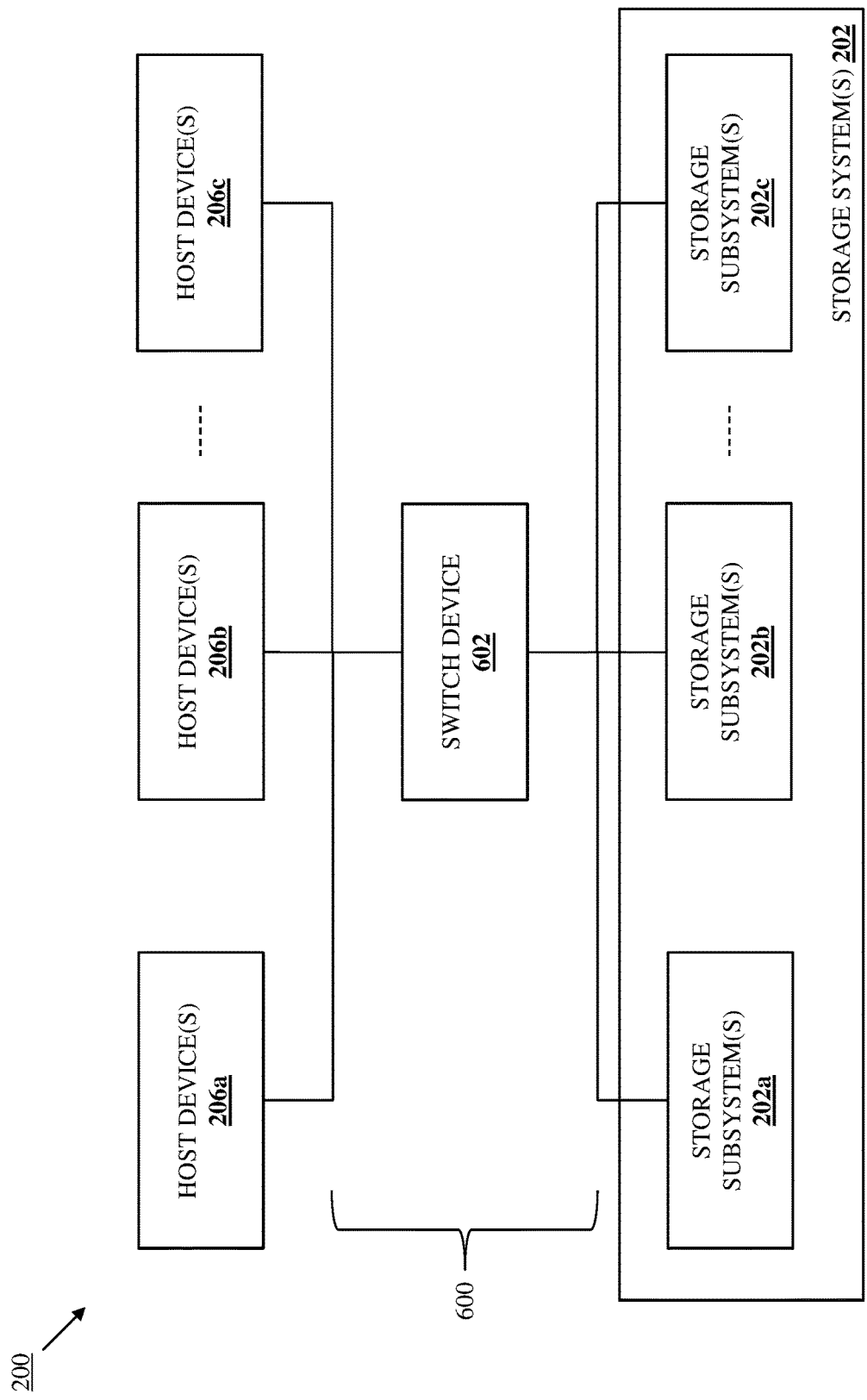
FIG. 6 is a schematic view illustrating an embodiment of a configuration of a SAN fabric in the conventional SAN of FIG. 2.

Referring to FIG. 6, an embodiment of a single/"big" switch configuration of a simplified SAN fabric 600 in the conventional SAN 200 discussed above with reference to FIG. 2 is illustrated, and one of skill in the art in possession of the present disclosure will appreciate how the SAN fabric 204 of the conventional SAN 200 discussed above with reference to FIGS. 2, 3A, and 3B may be provided by the SAN fabric 600. As discussed above and in further detail below, the congestion issues with the "spine-leaf" configuration of SAN fabrics discussed above leads many network administrators or other users to utilize the single/"big" switch configuration. As illustrated, the host devices 206a, 206b, and up to 206c may each be connected to a single/"big" switch device 602 in the SAN fabric 600, and that single/"big" switch device 602 in the SAN fabric 600 may be connected to each of the storage subsystems 202a, 202b, and up to 202c. As will be appreciated by one of skill in the art in possession of the present disclosure, the single/"big" switch device 602 may include a chassis housing modular port line cards and switch fabric cards that provide a number of ports sufficient to enable the connectivity to the host devices 206a-206c and storage subsystems 202a-202c discussed above.

As will be appreciated by one of skill in the art in possession of the present disclosure, single/"big" switch configurations like the SAN fabric 600 in the conventional SAN 200 illustrated in FIG. 6 may eliminate many of the congestion issues that result from the utilization of the plurality of independent leaf switch devices and spine switch devices in the "spine-leaf" configuration discussed above, as the centralization of control of data frame/packet transmission in the single/"big" switch device 602 enables resource allocation and congestion mitigation. However, one of skill in the art in possession of the present disclosure will also appreciate how, in some situations, congestion issues (e.g., the congestion spreading and head-of-line blocking discussed above) can be introduced in the port line cards and switch fabric cards provided in the single/"big" switch device 602, and thus single/"big" switch configurations do not completely eliminate the congestion issues with the "spine-leaf" configurations discussed above.

Furthermore, as also discussed above, single/"big" switch configurations like the SAN fabric 600 in the conventional SAN 200 illustrated in FIG. 6 complicate the cabling of the conventional SAN 200, as the cabling connections between the single/"big" switch device 602 and each of the host devices 206a-206c and storage subsystems 202a-202c provides a relatively large number of cables that converge on and must be connected to the single/"big" switch device 602. Further still, and as also discussed above, single/"big" switch configurations like the SAN fabric 600 in the conventional SAN 200 illustrated in FIG. 6 increase costs associated with the SAN fabric 600 due to the need to provide a fully redundant switch device for the single/"big" switch device 602 in order to eliminate the single/"big" switch device 602 as a single point of failure. Yet further still, and similarly to the "spine-leaf" configurations discussed above, a data packet transmitted through the single/"big" switch device 602 will be processed via at least an ingress port ASIC in an ingress port line card in the single/"big" switch device 602, a fabric ASIC in a switch fabric card in the single/"big" switch device 602, and an egress port ASIC in an egress port line card in the single/"big" switch device 602, and the three (or more) queueing systems used with those ASICs introduce latency into the data packet transmission process.

Referring now to FIG. 7, an embodiment of a real-world configuration 700 of the conventional SAN 200 of FIG. 2 including the SAN fabric 600 of FIG. 6 is illustrated. As illustrated, the real-world configuration 700 includes a storage system 702 that may include any of the storage subsystems 202a-202c discussed above. The real-world configuration 700 also includes a pair of redundant switch devices 704a and 704b that are each coupled to the storage system 702, either of which may provide the single/"big" switch device 602 discussed above with reference to FIG. 6, with the other providing the redundancy for that single/"big" switch device 602 as also discussed above. A pair of patch panel systems 706a and 706c are coupled to the switch device 704a, and a pair of patch panel systems 706b and 706d are coupled to the switch device 704b. Finally, a plurality of host devices 708a, 708b, 708c, and up to 708d are each connected to different combinations of the patch panel devices 706a-706d, with the host device 708a connected to the patch panel systems 706a and 706d, the host device 708b connected to the patch panel systems 706a and 706c, the host device 708c connected to the patch panel systems 706b and 706d, and the host device 708d connected to the patch panel systems 706b and 706c in the embodiment illustrated in FIG. 7. As such, one of skill in the art in possession of the present disclosure will appreciate how the real-world configuration 700 of FIG. 5 provides both the benefits and introduces the issues discussed above.

Figure 8A:
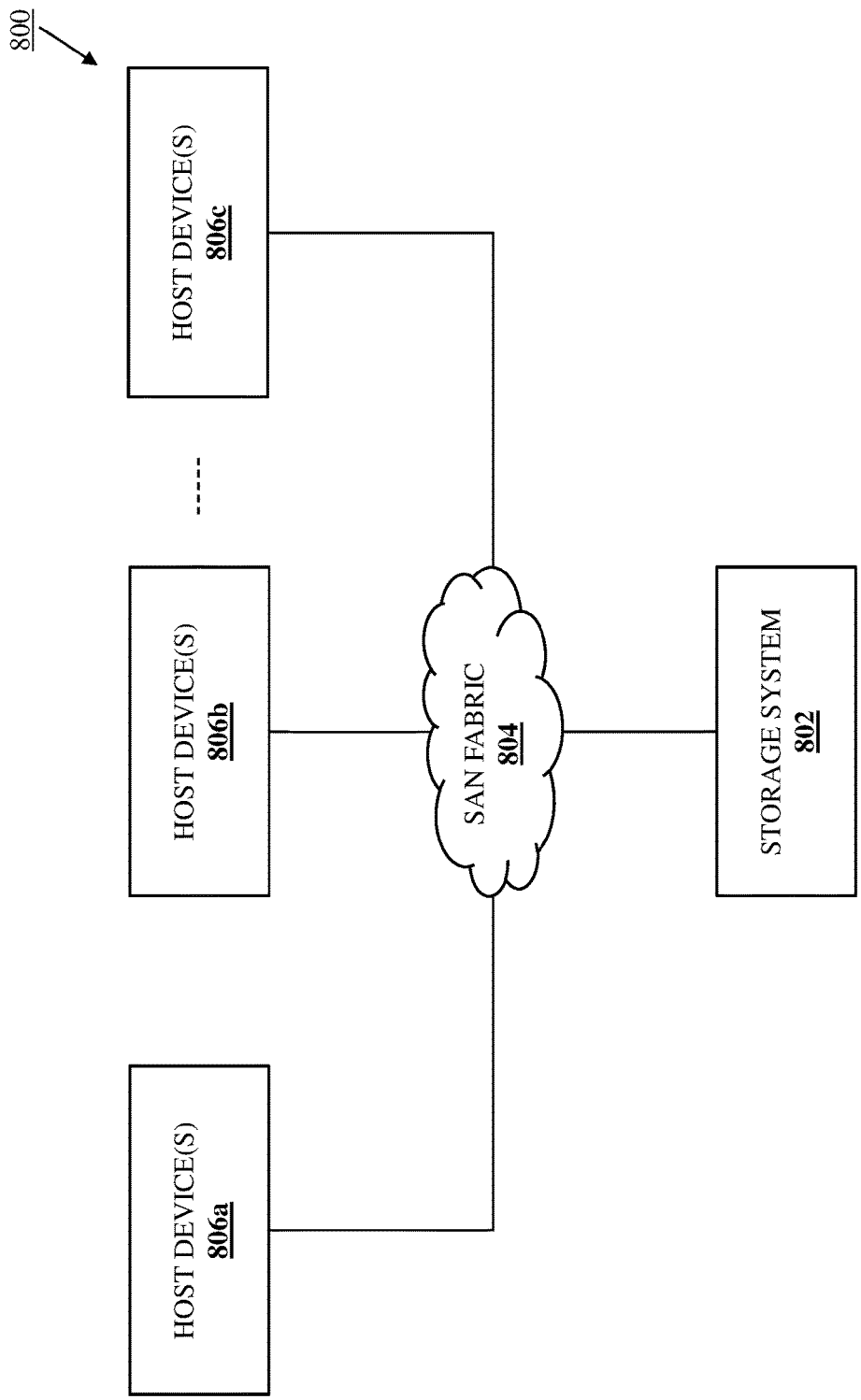
FIG. 8A is a schematic view illustrating an embodiment of a SAN that may provide the multiple independent storage fabric SAN system of the present disclosure.

As discussed in further detail below, the inventors of the present disclosure have developed a novel multiple independent switch fabric SAN configuration that eliminates the issues present in the "spine-leaf" configurations and single/"big" switch configurations discussed above. With reference to FIG. 8A, a generalized embodiment of a SAN 800 is illustrated that may provide the multiple independent storage fabric SAN system of the present disclosure. As will be appreciated by one of skill in the art in possession of the present disclosure, embodiments of the multiple independent storage fabric SAN system of the present disclosure capitalize on the fact that real-world SAN configuration (e.g., like the real-world configurations 500 and 700 discussed above with reference to FIGS. 5 and 7, respectively) typically utilize a single storage system.

As such, the illustrated embodiment of the SAN 800 includes a single storage system 802. In an embodiment, the storage system 802 may be provided by the IHS 100 discussed above with reference to FIG. 1, and/or may include some or all of the components of the IHS 100, and in specific examples may include a chassis housing a plurality of storage subsystems that may be provided by storage devices such as, for example, Non-Volatile Memory express (NVMe) storage devices that are configured to utilize NVMe over Transmission Control Protocol (TCP) (NVMe/TCP). However, while illustrated and discussed as being provided by a particular storage system including particular storage subsystems/storage devices utilizing a particular communication protocol, one of skill in the art in possession of the present disclosure will recognize that a storage system provided in the SAN 800 may include other storage systems that may be configured to operate similarly as the storage system 802 discussed below.

The SAN 800 also includes a SAN fabric 804 that is directly connected to the storage system 802 (e.g., via electrical conductor cabling such as copper twinax Direct Attach Cable (DAC) cabling, optical cabling such as optical fiber, and/or other cabling known in the art), as well as directly connected to each of one or more host devices 806*a*, one or more host devices 806*b*, and up to one or more host devices 806*c* (e.g., via electrical conductor cabling such as copper twinax DAC cabling). As will be appreciated by one of skill in the art in possession of the present disclosure, the direct connection of the SAN fabric 804 with each of the storage system 802 and the host devices 806*a*-806*c* may be provided by cabling and/or other direct communication connections that do not involve other networking devices such as the switch devices described herein. Furthermore, as discussed above, the SAN fabric 804 may be configured as a lossless SAN fabric using any of a variety of lossless fabric techniques that would be apparent to one of skill in the art in possession of the present disclosure.

In an embodiment, the host devices 806*a*-806*c* may be provided by the IHS 100 discussed above with reference to FIG. 1, and/or may include some or all of the components of the IHS 100, and in specific examples may each provided by one or more server devices that are configured to provide host(s). However, while illustrated and discussed as being provided by server devices, one of skill in the art in possession of the present disclosure will recognize that host devices provided in the SAN 800 may include other computing devices that may be configured to provide hosts and/or otherwise operate similarly as the host devices 806*a*-806*c* discussed below. Furthermore, while a generalized embodiment of a SAN providing the multiple independent storage fabric SAN system of the present disclosure has been illustrated and described, one of skill in the art in possession of the present disclosure will appreciate how the multiple independent storage fabric SAN system of the present disclosure may be provided using a variety of components and/or components configurations that will fall within the scope of the present disclosure as well.

Figure 8B:
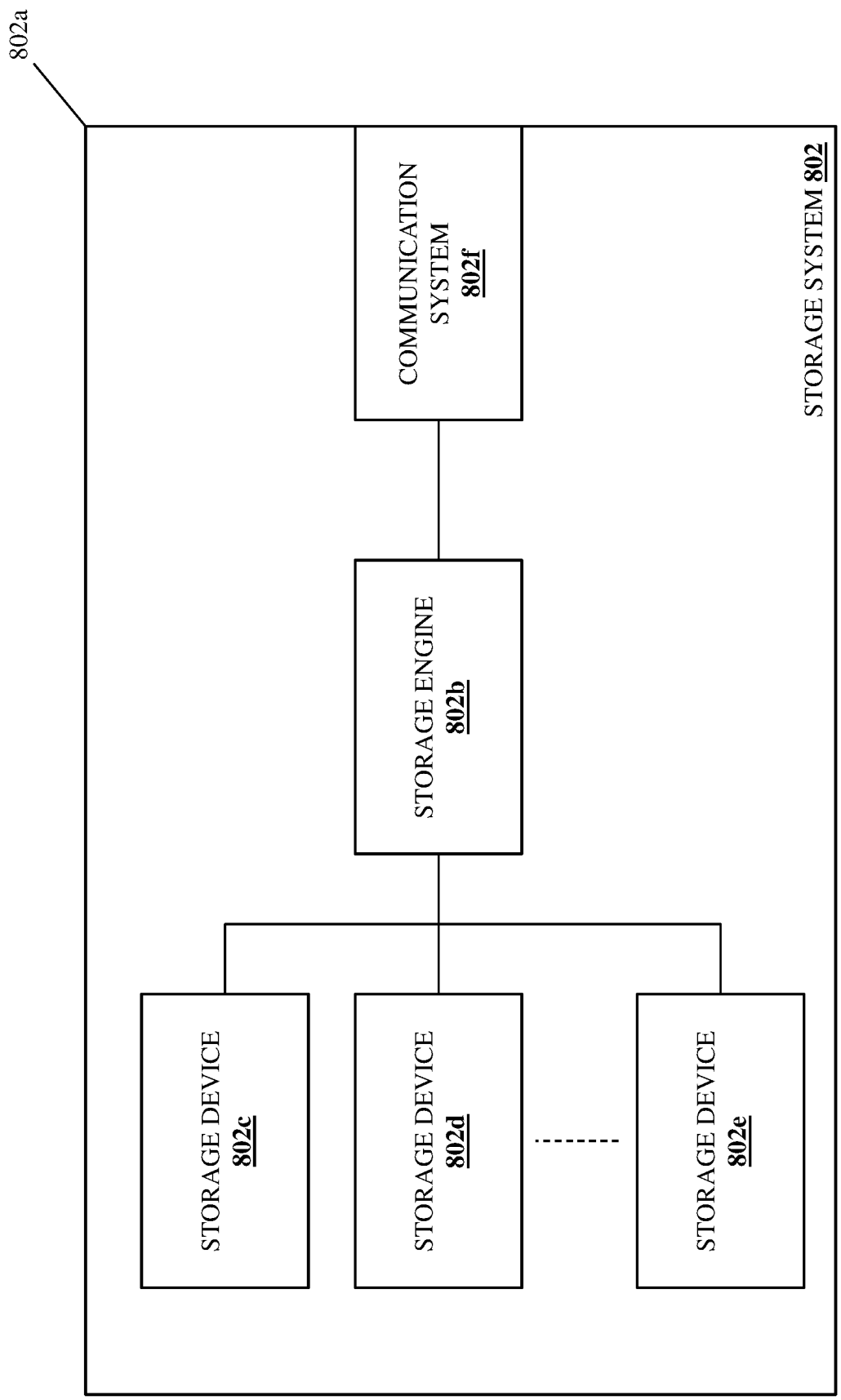
FIG. 8B is a schematic view illustrating an embodiment of a storage system that may be provided in the SAN of FIG. 8A.

Referring now to FIG. 8B, an embodiment of the storage system 802 is illustrated. In the illustrated embodiment, the storage system 802 includes a chassis 802*a* that houses the components of the storage system 802, only some of which are illustrated and discussed below. For example, the chassis 802*a* may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage engine 802*b* that is configured to perform the functionality of the storage engines and/or storage systems discussed below. For example, the storage engine 802*b* may be included in and/or configured to provide the Direct Discovery Controller (DDC) device utilized in some of the embodiments discussed below, the storage data traffic transmission functionality described below, as well as any other storage system operations that one of skill in the art in possession of the present disclosure would recognize as providing any of the functionality discussed below.

The chassis 802*a* may also house a plurality of storage devices 802*c*, 802*d*, and up to 802*c*, each of which is coupled to the storage engine 802*b* (e.g., via a coupling between the storage devices and the processing system), and each of which may be provided by NVMe storage devices that are configured to utilize NVMe/TCP in specific examples. The chassis 802*a* may also house a communication system 802*f* that is coupled to the storage engine 802*b* (e.g., via a coupling between the communication system 802*f* and the processing system) and that may be provided by any of a variety of storage system communication components that would be apparent to one of skill in the art in possession of the present disclosure. However, while a specific storage system 802 has been illustrated and described, one of skill in the art in possession of the present disclosure will recognize that storage systems may include a variety of components and/or component configurations for providing conventional storage system functionality, as well as the functionality discussed below, while remaining within the scope of the present disclosure as well.

With reference to FIGS. 8A, 8B, and 8C, one of skill in the art in possession of the present disclosure will appreciate that the SAN fabric 804 in the SAN 800 including the single storage system 802 provides "any-to-one" connectivity between the host devices 806*a*-806*c* and the single storage subsystem 802 (e.g., such that any host device 806*a*-806*c* in the SAN 800 may connect to and communicate with the single storage system 802 in the SAN 800), rather than the "any-to-any" connectivity provided by the conventional SAN 200 discussed above. In other words, as can be seen in FIG. 8C, the SAN fabric 804 provides connectivity 808*a* between the host device(s) 806*a* and the storage system 802, connectivity 808*b* between the host device(s) 806*b* and the storage system 802, and connectivity 808*c* between the host device(s) 806*c* and the storage system 802. As such, the zoning techniques discussed above need not be utilized in the SAN 800, as each host device 806*a*-806*c* is configured with connectivity needed to access the single storage system 802, and one of skill in the art in possession of the present disclosure will appreciate how the connectivity 808a, 808b, and 808c could be enabled via respective cabling connecting each host device 806a-806c to the single storage system 802 (i.e., without the need for switch devices to provide the SAN fabric 804).

However, because the SAN 800 will often include many more host devices/hosts than storage system ports on the communication system 802f of the storage system 802, the SAN fabric 804 in the SAN 800 providing the multiple independent storage fabric SAN system of the present disclosure may be implemented using switch devices. For example, with reference to FIG. 9A, an embodiment of a simplified SAN fabric 900 in the SAN 800 discussed above with reference to FIG. 8A is illustrated, and one of skill in the art in possession of the present disclosure will appreciate how the SAN fabric 804 of the SAN 800 discussed above with reference to FIG. 8A may be provided by the SAN fabric 900.

As illustrated, the host devices 806a and up to 806b may each be directly connected to a switch device 902 in the SAN fabric 900 (e.g., via electrical conductor cabling such as the copper twinax DAC cabling discussed above), with the switch device 902 directly connected to the storage system 802 (e.g., via electrical conductor cabling such as the copper twinax DAC cabling discussed above, optical cabling such as optical fiber, and/or other cabling known in the art). Similarly, the host device(s) 806c may each be directly connected to a switch device 904 in the SAN fabric 900 (e.g., via electrical conductor cabling such as the copper twinax DAC cabling discussed above), with the switch device 904 directly connected to the storage system 802 (e.g., via electrical conductor cabling such as the copper twinax DAC cabling discussed above, optical cabling such as optical fiber, and/or other cabling known in the art). As will be appreciated by one of skill in the art in possession of the present disclosure, the switch devices 902 and 904 may each be provided by relatively low cost switch devices compared to, for example, the single/"big" switch device discussed above. Furthermore, the storage system 802 is illustrated as including a DDC device 906 that may be provided by the storage engine 802b as discussed above.

However, while two different physical switch devices 902 and 904 are illustrated and described in FIG. 9A, one of skill in the art in possession of the present disclosure will appreciate how the functionality of the switch devices 902 and 904 may be provided by a single physical switch device that has been partitioned to provide a first virtual switch device that operates in the manner described for the switch device 902 below and a second virtual switch device that operates in the manner described for the switch device 904 below. Furthermore, one of skill in the art in possession of the present disclosure will appreciate how the virtual switch device concept described above may be extended to any number of virtual switch devices provided by one or more physical switch devices. For example, one of skill in the art in possession of the present disclosure will recognize how a single physical switch device may provide a single physical fabric, and then how Virtual Local Area Networks (VLANs) may be used to partition that single physical switch device to provide any number of virtual fabrics that operate similarly as the physical fabrics provided by the switch devices 902 and 904 as discussed below.

As such, the switch devices 902 and 904 that provide the SAN fabric 900 may provide respective "host aggregation switch devices" that enable the connectivity for the host devices 806a-806b and the host device(s) 806c, respectively, while aggregating multiple host devices for a relatively smaller number of storage system ports on the communication system 802f of the storage system 802 (e.g., with the switch device 902 aggregating two or more host devices 806a-806c to a single storage system port on the communication system 802f of the storage system 802, and the switch device 904 aggregating one or more host device(s) 806c to a single storage system port on the communication system 802f of the storage system 802 in the illustrated example). FIG. 9B generalizes the configuration illustrated in FIG. 9A as a multiple independent storage fabric configuration of the SAN fabric 900 that includes a SAN fabric 902a connecting the host devices 806a-806b to the storage system 802, and a SAN fabric 904a that is independent from the SAN fabric 902a and that connects the host device(s) 806c to the storage system 802, with the SAN fabrics 902a and 904a (e.g., the switch devices 902 and 904) not configured to transmit storage data traffic between each other.

As will be appreciated by one of skill in the art in possession of the present disclosure, the multiple independent storage fabric configuration may be configured to allow each host device 806a-806c to access all namespaces on the storage system 802 through a fixed allocation of those host devices to storage system ports on the communication system 802f of the storage system 802, with storage data traffic between the host devices 806a-806b and the storage system 802 transmitted via the SAN fabric 902a, and storage data traffic between the host device(s) 806c and the storage system 802 transmitted via the SAN fabric 904a. Furthermore, one of skill in the art in possession of the present disclosure will recognize how the independent SAN fabrics 902a and 904a each provide "hard" containment of congestion within that SAN fabric due to the inability of either of those SAN fabrics to transmit storage data traffic to the other SAN fabric. Further still, provisioning of the SAN fabrics 902a and 904a using the respective single switch devices 902 and 904 having single ASICs reduces the latency in data transmission process relative to the "spine-leaf" configurations or single/"big" switch configurations of the conventional SAN fabrics discussed above due to the use of a single queueing system used by either of those ASICs relative to the three (or more) queueing systems required in the ASICs utilized in the conventional SAN fabrics.

In specific examples in which the storage system 802 includes NVMe storage devices using NVMe/TCP, the SAN fabric 900 provides a single "disaggregated" SAN with multiple SAN fabric configurations, and one of skill in the art in possession of the present disclosure will recognize how the independent Ethernet/IP-based SAN fabrics 902a and 904a provided by the SAN fabric 900 may be configured to be "transparent" to the storage layer in the storage system 802, with the storage system 802 fully managed by the DDC device 906 hosted or otherwise provided in the storage system 802. As will be appreciated by one of skill in the art in possession of the present disclosure, in such examples the switch devices 902 and 904 need not be configured to be IP-aware or perform any functionality from a storage transport point-of-view, and rather may simply be configured to enable the connectivity between the host devices 806a-806b and the storage system 802, as well as between the host device(s) 806c and the storage system 802 (e.g., using the cabling discussed above).

Figure 9A:
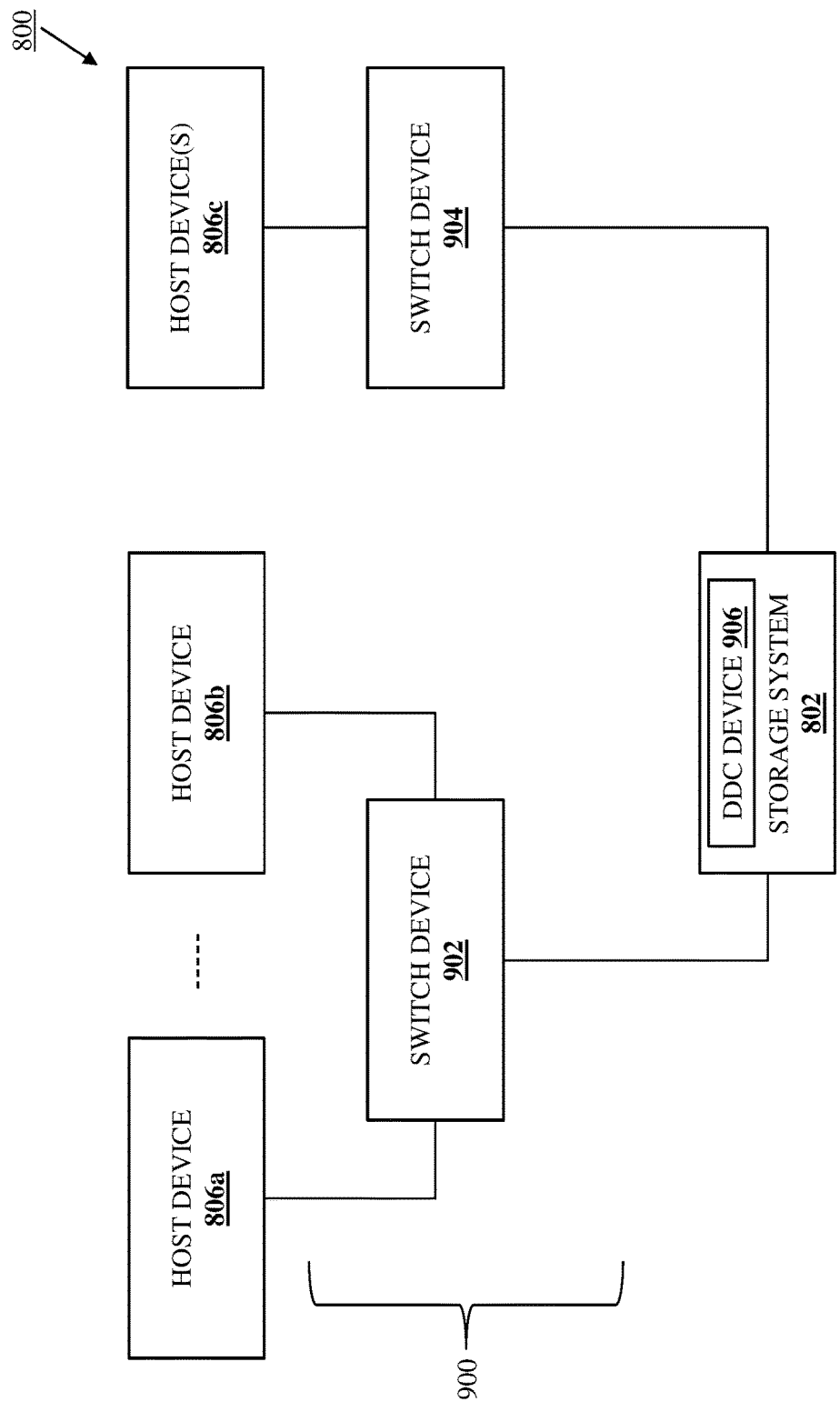
FIG. 9A is a schematic view illustrating an embodiment of a configuration of a SAN fabric in the SAN of FIG. 8A.
Figure 9B:
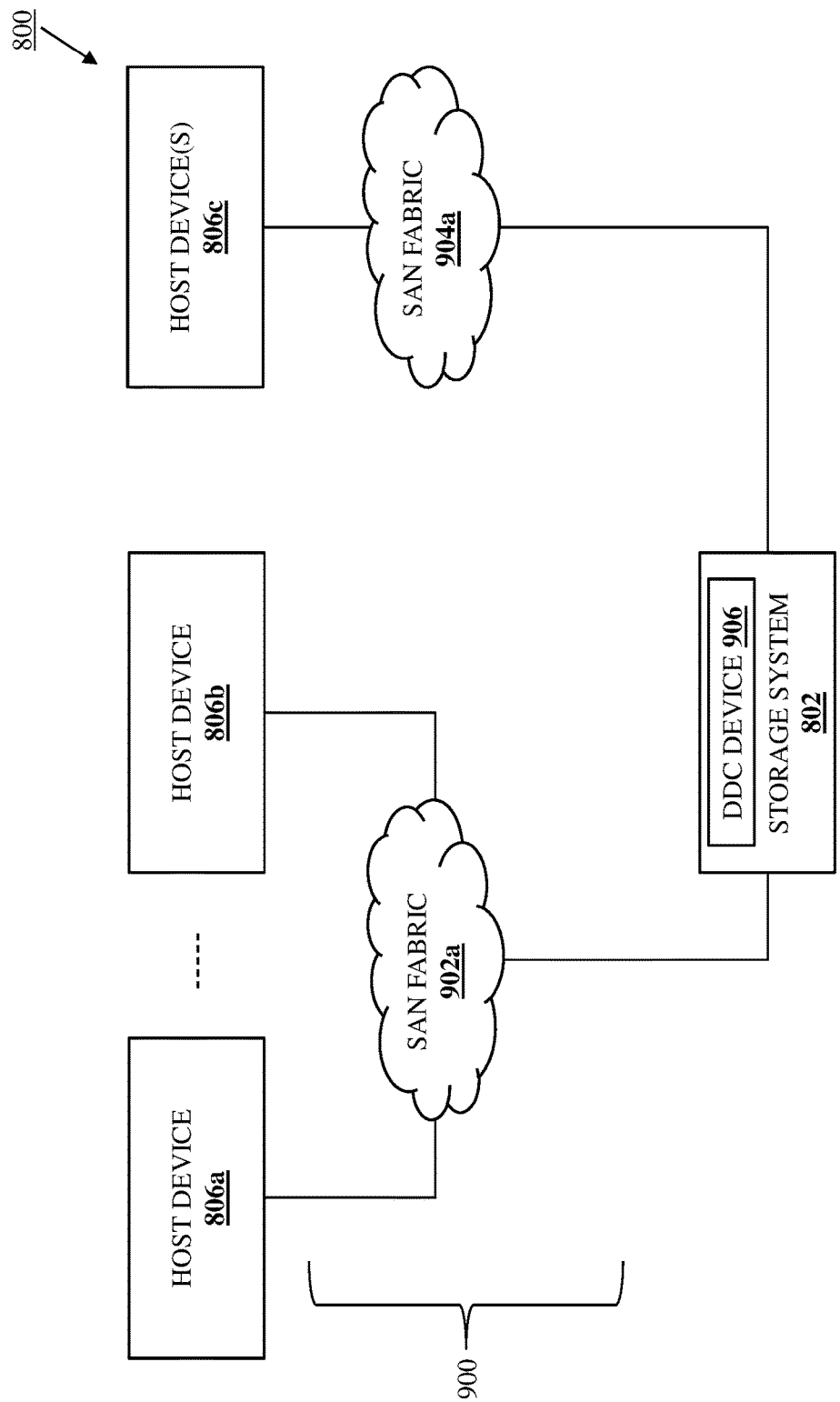
FIG. 9B is a schematic view illustrating an embodiment of the configuration of the SAN fabric in the SAN of FIG. 9A.
Figure 10:
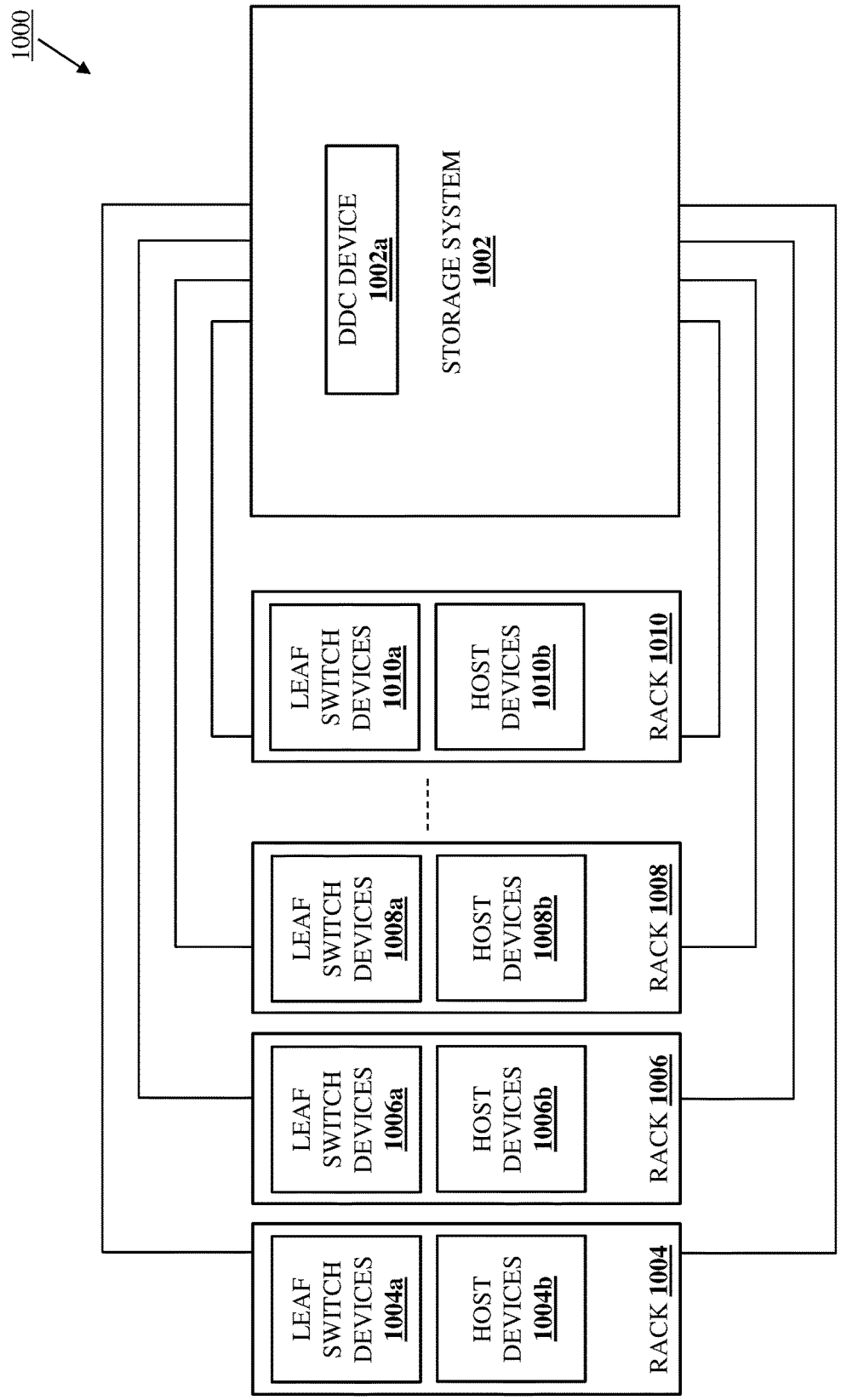
FIG. 10 is a schematic view illustrating an embodiment of a real-world configuration of the SAN of FIG. 9A.

With reference to FIG. 10, an embodiment of a real-world configuration 1000 of the SAN 800 including the SAN fabric 900 of FIG. 9A is illustrated. As illustrated, the real-world configuration 1000 includes a storage system 1002 that may include the storage engine 802b providing a DDC device 1002a, as well as any of the storage devices 802c-802e discussed above. The real-world configuration 1000 also includes a rack 1004 housing leaf switch devices 1004a (e.g., a pair of redundant TOR leaf switch devices) connected to host devices 1004b (e.g., server devices), a rack 1006 housing leaf switch devices 1006a (e.g., a pair of redundant TOR leaf switch devices) connected to host devices 1006b (e.g., server devices), a rack 1008 housing leaf switch devices 1008a (e.g., a pair of redundant TOR leaf switch devices) connected to host devices 1008b (e.g., server devices), and up to a rack 1010 housing leaf switch devices 1010a (e.g., a pair of redundant TOR leaf switch devices) connected to host devices 1010b (e.g., server devices).

Furthermore, the real-world configuration 1000 also includes each of the leaf switch devices 1004a connected to the storage system 1002, each of the leaf switch devices 1006a connected to the storage system 1002, each of the leaf switch devices 1008a connected to the storage system 1002, and each of the leaf switch devices 1010a connected to the storage system 1002. One of skill in the art in possession of the present disclosure will appreciate how the leaf switch devices in each rack operate to provide redundant connections to the storage system 1002 for the host devices in that rack. Furthermore, one of skill in the art in possession of the present disclosure will recognize how the real-world configuration 1000 results in the need for fewer switch devices (i.e., the spine switch devices utilized in the "spine-leaf" configurations discussed above are eliminated), reduced cabling, less latency in the data transmission process, and/or any of the other benefits discussed above.

However, while the embodiments of the multiple independent storage fabric SAN system discussed above focus on the use of a single storage system, the multiple independent storage fabric SAN system of the present disclosure may be generalized to provide multiple storage systems as long as host devices connected to a switch device in the SAN fabric need only access the storage system connected to that switch device. Furthermore, one of skill in the art in possession of the present disclosure will appreciate how the host device/switch device/storage system constraint discussed above will be satisfied in practice if all host devices are allowed to access all storage systems in a multi-storage-system SAN.

Figure 11A:
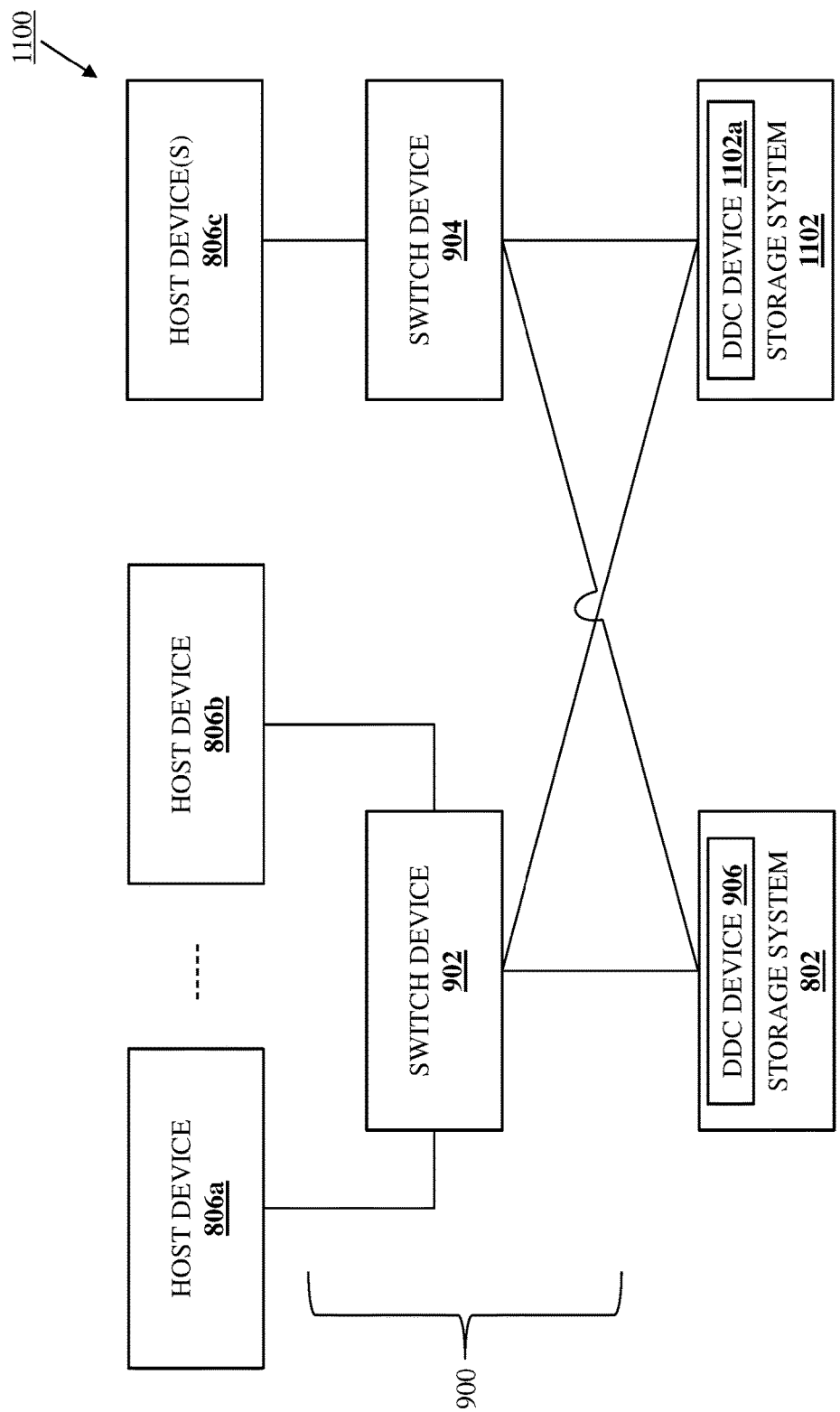
FIG. 11A is a schematic view illustrating an embodiment of a SAN that may provide the multiple independent storage fabric SAN system of the present disclosure.

For example, with reference to FIG. 11A, an embodiment of a SAN 1100 is illustrated that is substantially similar to the SAN 800 having the SAN fabric 900 discussed above with reference to FIG. 9A, with similar elements provided with similar element numbers. However, as can be seen, the SAN 1100 includes a storage system 1102 including a DDC device 1102a that may be provided by the storage engine 802b as discussed above. As illustrated, the switch device 902 is directly connected to each of the storage system 802 and the storage system 1102 (e.g., via respective electrical conductor cabling such as the copper twinax DAC cabling discussed above, optical cabling such as optical fiber, and/or other cabling known in the art), and the switch device 904 is directly connected to each of the storage system 802 and the storage system 1102 (e.g., via respective electrical conductor cabling such as the copper twinax DAC cabling discussed above, optical cabling such as optical fiber, and/or other cabling known in the art). Furthermore, similarly as described above, FIG. 11B generalizes the configuration illustrated in FIG. 11A as a multiple independent storage fabric configuration of the SAN fabric 900 that includes the SAN fabric 902a connecting the host devices 806a-806b to each of the storage systems 802 and 1102, and the SAN fabric 904a that is independent from the SAN fabric 902a and that connects the host device(s) 806c to the storage systems 802 and 1102, with the SAN fabrics 902a and 904a (e.g., the switch devices 902 and 904) not configured to transmit storage data traffic between each other.

With reference back to FIG. 9B, while the multiple independent storage fabric configuration of the SAN fabric 900 including the SAN fabric 902a and the SAN fabric 904a is a single SAN 800 from a storage point-of-view, one of skill in the art in possession of the present disclosure will appreciate how each SAN fabric 902a and 904a may require individual management from a networking point-of-view. For example, while the SAN fabrics 902a and 904a do not require management as discussed above, a networking administrator or other user may choose to configure those switch fabrics 902a and 904a (e.g., the switch devices 902 and 904) for management so that, for example, in the event something goes wrong with one of the switch devices 902 or 904, the network administrator or other user may troubleshoot that switch device (e.g., to identify an unavailable port on a switch device).

As such, in some embodiments, a management network may be set up for the switch devices 902 and 904/switch fabrics 902a and 904a. For example, with reference to FIG. 12, an embodiment of a SAN 1200 is illustrated that is substantially similar to the SAN 800 having the SAN fabric 900 discussed above with reference to FIG. 9A, with similar elements provided with similar element numbers. However, as can be seen, the SAN 1200 includes a management fabric 1202 that, in the illustrated embodiment, includes a control switch device 1204a connected to each of the switch devices 902 and 904, a control switch device 1204b connected to each of the switch devices 902 and 904, and one or more management devices 1206 that are connected to each of the control switch devices 1204a and 1204b and that one of skill in the art in possession of the present disclosure will recognize may perform any of a variety of management operations on the switch devices 902 and 904 via the control switch devices 1204a and/or 1204b. As will be appreciated by one of skill in the art in possession of the present disclosure, the management fabric 1202 in the SAN 1200 illustrated in FIG. 12 operates to merge the switch fabrics 902a and 904a as part of a single management fabric 1202 from a control plane perspective, while those switch fabrics 902a and 904a are kept separate from a data plane perspective.

While one of skill in the art in possession of the present disclosure will recognize that the network topology of the SAN 1200 technically includes a "spine-leaf" configuration (e.g., the "spine-leaf" configuration provided by the switch devices 902/904 and the control switch devices 1204a/1204b), one of skill in the art in possession of the present disclosure will appreciate how the SAN 1200 handles storage data traffic similarly as the SAN 800 discussed above and differently than the SAN 200 with the SAN fabric 400 having the "spine-leaf" configuration discussed above with reference to FIG. 4, while handling the management data traffic via the "spine-leaf" configuration introduced by the control switch devices 1204a and 1204b in the management fabric 1202.

Similarly as discussed above, the multiple independent storage fabric configuration of the SAN 1200 may be configured to allow each host device 806a-806c to access all namespaces on the storage system 802 through a fixed allocation of those host devices to storage system ports on the communication system 802f of the storage system 802, with storage data traffic between the host devices 806a-806b and the storage systems 802 and/or 804 transmitted via the switch device 902, and storage data traffic between the host device(s) 806c and the storage systems 802 and/or 804 transmitted via the switch device 904. As such, the independent switch devices 902 and 904 each provide "hard" containment of congestion due to the inability of either of those switch devices to transmit storage data traffic to the other switch device, and the use of single switch devices having single ASICs reduces the latency in data transmission process relative to the "spine-leaf" configurations or single/"big" switch configurations of the conventional SAN fabrics discussed above due to the use of a single queueing system used by either of those ASICs relative to the three (or more) queueing systems required in the ASICs utilized in the conventional SAN fabrics.

Figure 12:
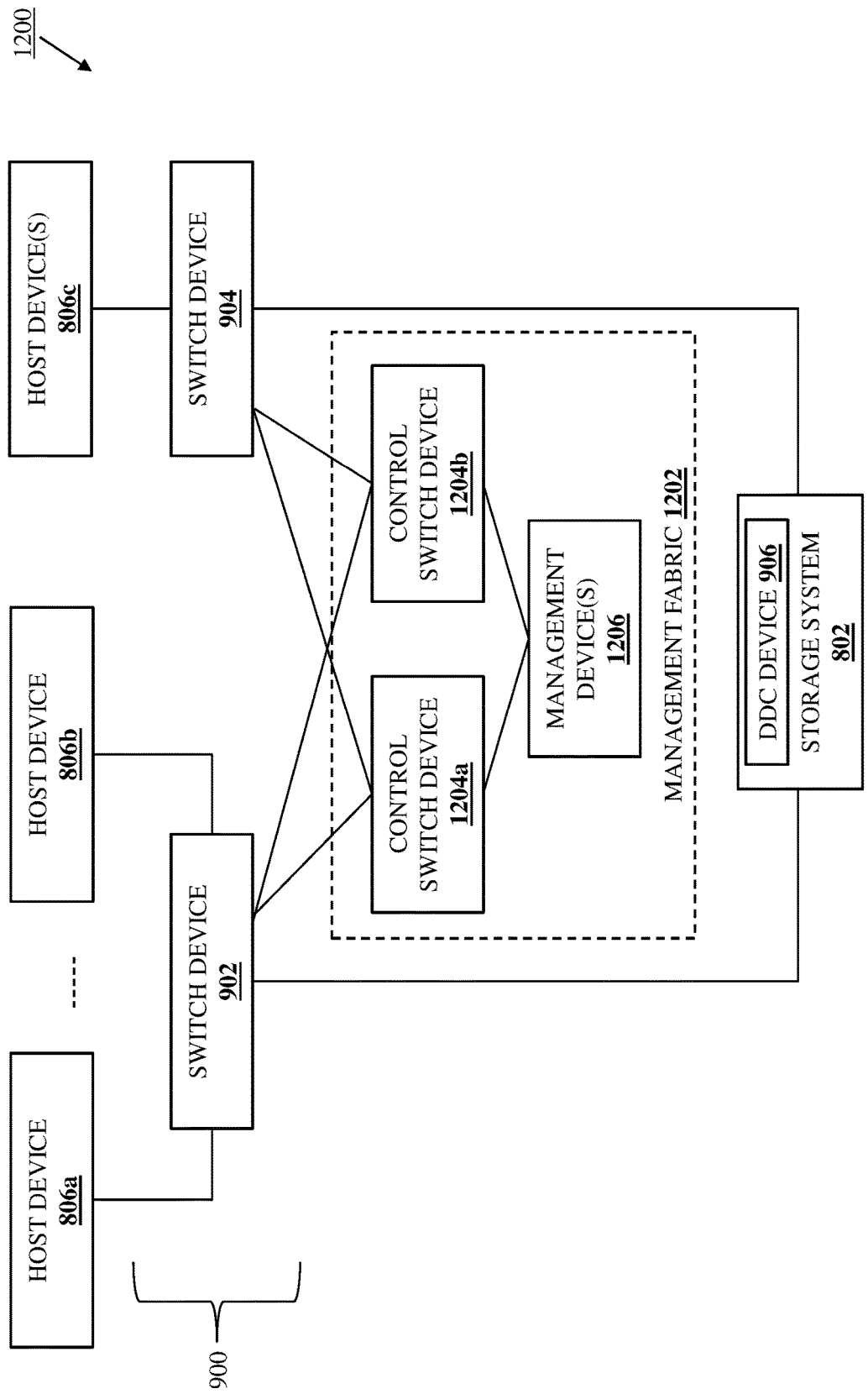
FIG. 12 is a schematic view illustrating an embodiment of a configuration of a management fabric in the SAN of FIG. 8A.
Figure 13A:
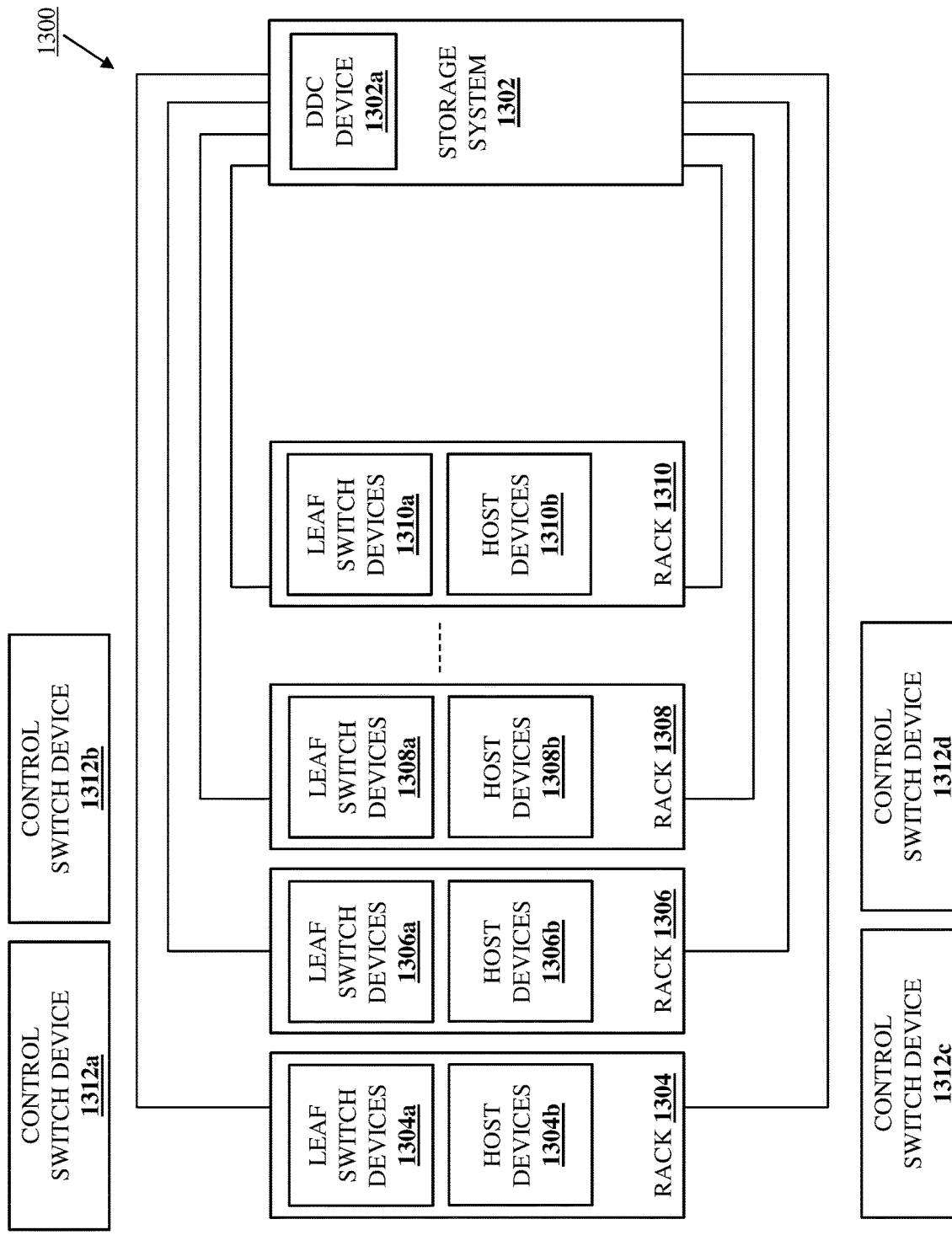
FIG. 13A is a schematic view illustrating an embodiment of a real-world configuration of the SAN of FIG. 12.
Figure 13B:
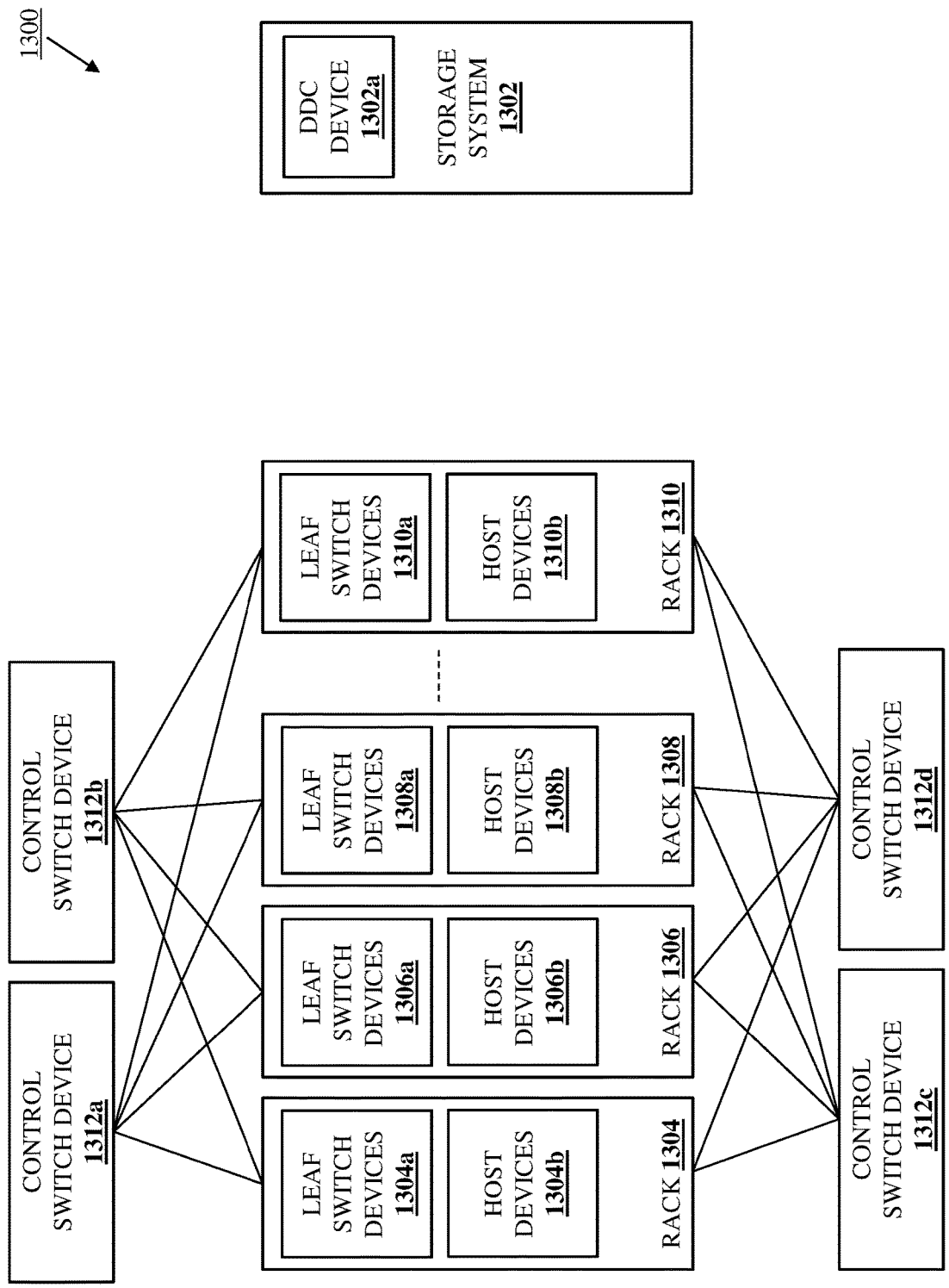
FIG. 13B is a schematic view illustrating an embodiment of a real-world configuration of the SAN of FIG. 12.

Referring now to FIGS. 13A and 13B, an embodiment of a real-world configuration 1300 of the SAN 1200 including the SAN fabric 900 and management fabric 1202 of FIG. 12 is illustrated. As illustrated, the real-world configuration 1300 includes a storage system 1302 that may include the storage engine 802b providing a DDC device 1302a, as well as any of the storage devices 802c-802e discussed above. The real-world configuration 1300 also includes a rack 1304 housing leaf switch devices 1304a (e.g., a pair of redundant TOR leaf switch devices) connected to host devices 1304b (e.g., server devices), a rack 1306 housing leaf switch devices 1306a (e.g., a pair of redundant TOR leaf switch devices) connected to host devices 1306b (e.g., server devices), a rack 1308 housing leaf switch devices 1308a (e.g., a pair of redundant TOR leaf switch devices) connected to host devices 1308b (e.g., server devices), and up to a rack 1310 housing leaf switch devices 1310a (e.g., a pair of redundant TOR leaf switch devices) connected to host devices 1310b (e.g., server devices).

Furthermore, as can be seen in FIG. 13A, the real-world configuration 1300 also includes each of the leaf switch devices 1304a connected to the storage system 1302, each of the leaf switch devices 1306a connected to the storage system 1302, each of the leaf switch devices 1308a connected to the storage system 1302, and each of the leaf switch devices 1310a connected to the storage system 1302. One of skill in the art in possession of the present disclosure will appreciate how the leaf switch devices in each rack operate to provide redundant connections to the storage system 1302 for the host devices in that rack. The real-world configuration 1300 also includes control switch devices 1312a and 1312b that are connected to each of the leaf switch devices 1304a. 1306a, 1308a, and 1310a in the racks 1304, 1306, 1308, and 1310, respectively. Furthermore, the real-world configuration 1300 also includes control switch devices 1312c and 1312d that are connected to each of the leaf switch devices 1304a, 1306a, 1308a, and 1310a in the racks 1304, 1306, 1308, and 1310, respectively. One of skill in the art in possession of the present disclosure will appreciate how the control switch devices 1312a/1312b and the control switch devices 1312c/1312d operate to provide redundant connections to the leaf switch devices 1304a, 1306a, 1308a, and 1310a for each of the management device(s) 1206.

Similarly as discussed above, while the embodiments of the multiple independent storage fabric SAN system discussed above focus on the use of a single storage system with a management fabric, the multiple independent storage fabric SAN system of the present disclosure may be generalized to provide multiple storage systems with a management fabric as long as host devices connected to a switch device in the SAN fabric need only access the storage system connected to that switch device. Furthermore, one of skill in the art in possession of the present disclosure will appreciate how the host device/switch device/storage system constraint discussed above will be satisfied in practice if all host devices are allowed to access all storage systems in a multi-storage-system SAN.

Figure 14:
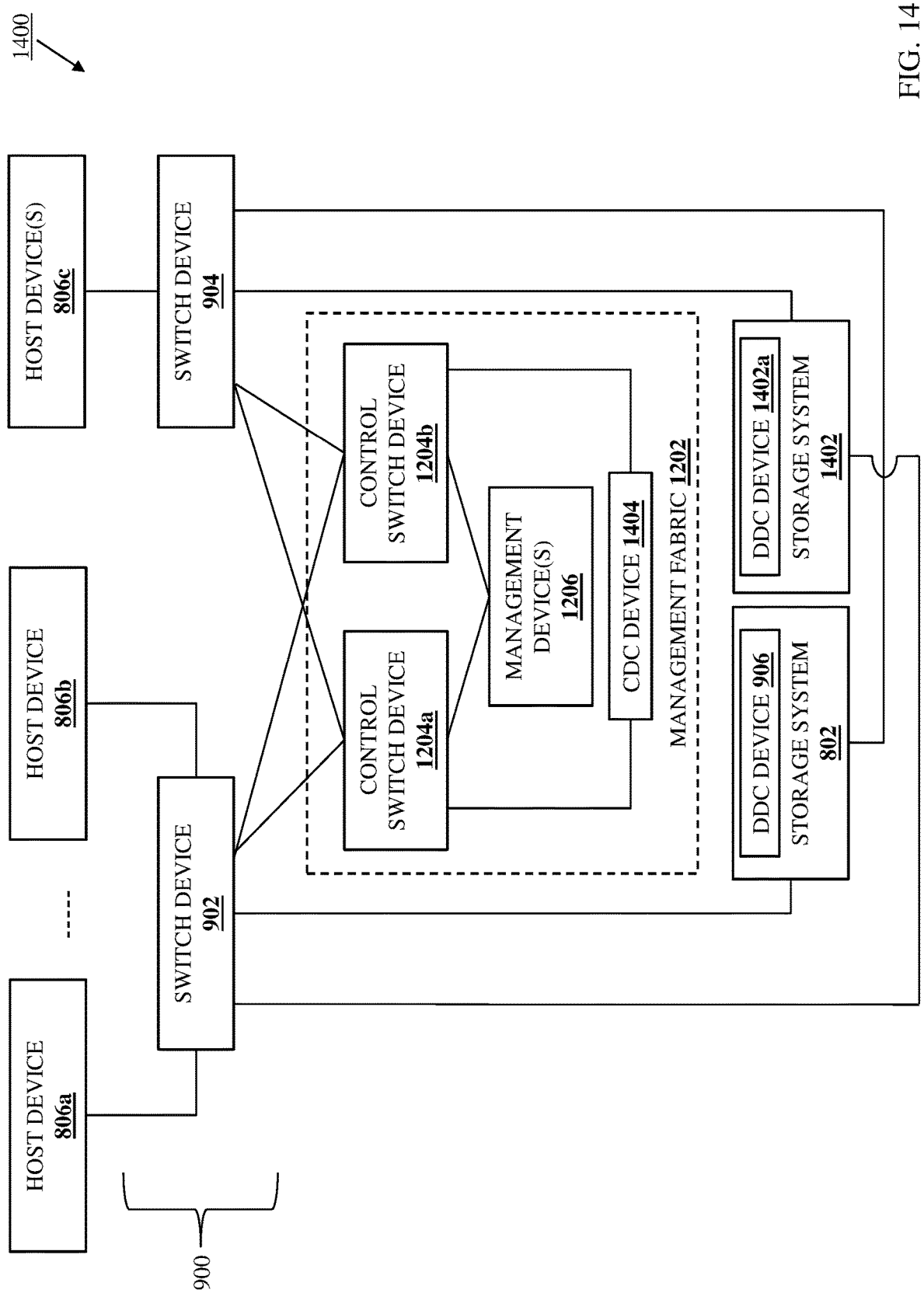
FIG. 14 is a schematic view illustrating an embodiment of a SAN that may provide the multiple independent storage fabric SAN system of the present disclosure.

For example, with reference to FIG. 14, an embodiment of a SAN 1400 is illustrated that is substantially similar to the SAN 1200 having the SAN fabric 900 and the management fabric 1202 discussed above with reference to FIG. 12, with similar elements provided with similar element numbers. However, as can be seen, the SAN 1400 includes a storage system 1402 including a DDC device 1402a that may be provided by the storage engine 802b as discussed above. As illustrated, the switch device 902 is directly connected to each of the storage system 802 and the storage system 1402 (e.g., via respective electrical conductor cabling such as the copper twinax DAC cabling discussed above, optical cabling such as optical fiber, and/or other cabling known in the art), and the switch device 904 is directly connected to each of the storage system 802 and the storage system 1402 (e.g., via respective electrical conductor cabling such as the copper twinax DAC cabling discussed above, optical cabling such as optical fiber, and/or other cabling known in the art). Furthermore, a Centralized Discovery Controller 1404 may be provided in the management fabric 1202 and coupled to the control switch devices 1204a and 1204b for use with the DDC devices 906 and 1402a in the storage systems 906 and 1402, respectively. For example, the CDC device 1404 may be configured to aggregate discovery information retrieved via discovery storage services performed by each of the DDC devices 906 and 1402a and provide a single point of management of the SAN 1400/SAN fabric 900.

Figure 15:
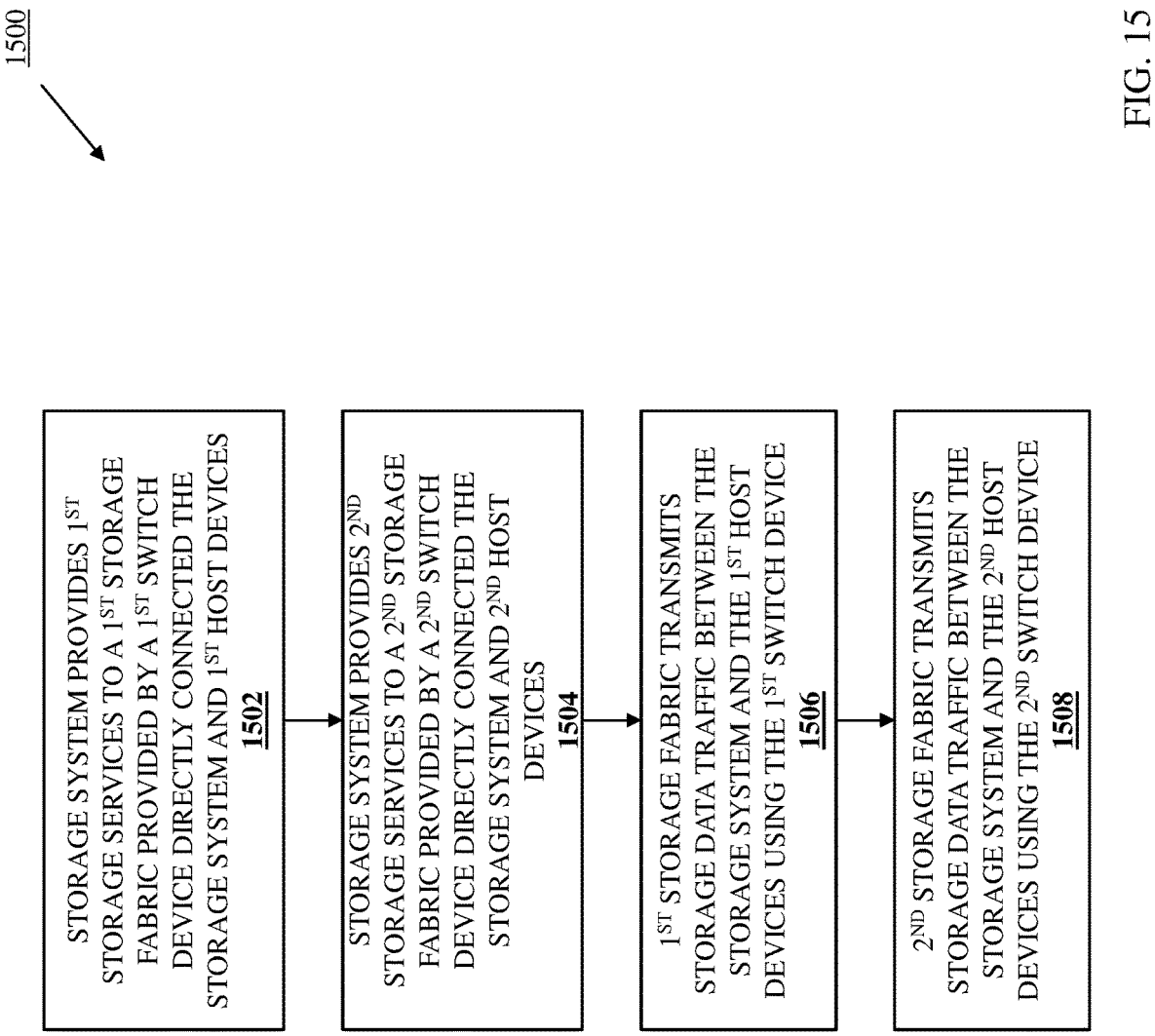
FIG. 15 is a flow chart illustrating an embodiment of a method for providing multiple independent storage fabrics in a SAN.

Referring now to FIG. 15, an embodiment of a method 400 for providing multiple independent storage fabrics in a Storage Area Network (SAN) is illustrated. As discussed below, the systems and methods of the present disclosure provide multiple independent storage fabrics in a SAN in order to address several issues present in conventional SANs. For example, the multiple independent storage fabric SAN system of the present disclosure may include a storage system. A first storage fabric includes a first switch device that is directly connected to the storage system, and first host devices that are directly connected to the first switch device and each configured to transmit storage data traffic via the first switch device with the storage system. A second storage fabric is independent from the first storage fabric and includes a second switch device that is directly connected to the storage system and that is not configured to transmit storage data traffic with the first switch device, and second host devices that are directly connected to the second switch device and each configured to transmit storage data traffic via the second switch device with the storage system. The storage system is configured to provide first storage services to each of the first storage fabric and the second storage fabric. As such, congestion issues, latency issues, cabling issues, and expense issues associated with conventional SANs are reduced or eliminated.

The method 1500 begins at block 1502 where a storage system provides first storage services to a first storage fabric provided by a first switch device directly connected to the storage system and first host devices. In an embodiment, at block 1502, the DDC device in any of the storage systems discussed above may provide storage services to a first storage fabric provided by a switch device that is directly connected to that storage system and host devices. For example, storage services provided by the DDC device in any of the storage systems discussed above may include discovery storage services, data storage services, and/or any other storage services that one of skill in the art in possession of the present disclosure would recognize as conventionally being performed by the first storage fabric. With reference to the specific example provided above with reference to FIGS. 9A/9B or FIG. 12, the DDC device 906 in the storage system 802 may provide storage services for the switch device 902/SAN fabric 902a that is directly coupled to each of the host devices 806a-806b and the storage system 802 in order to, for example, allow the host devices 806a-806b to discover the storage system 802, allow the host devices 806a-806b to store data in the storage system 802, and/or perform any other storage services that would be apparent to one of skill in the art in possession of the present disclosure.

Figure 11B:
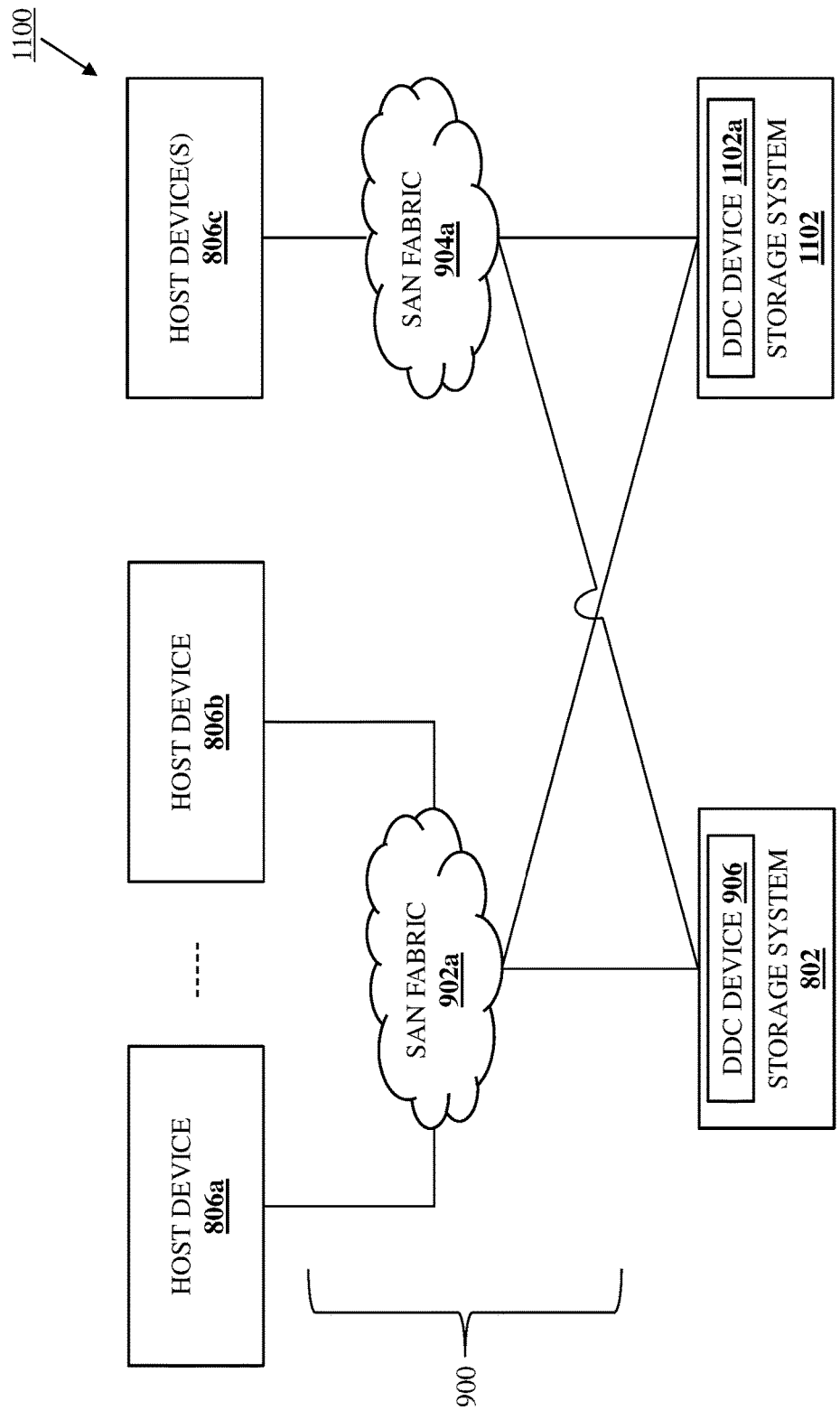
FIG. 11B is a schematic view illustrating an embodiment of the configuration of the SAN fabric in the SAN of FIG. 11A.

Similarly, with reference to the specific example provided above with reference to FIGS. 11A and 11B, the DDC device 906 in the storage system 802 may provide storage services for the switch device 902/SAN fabric 902a that is directly coupled to each of the host devices 806a-806b and the storage system 802 in order to, for example, allow the host devices 806a-806b to discover the storage system 802, allow the host devices 806a-806b to store data in the storage system 802, and/or perform any other storage services that would be apparent to one of skill in the art in possession of the present disclosure. In addition, the DDC device 1102a in the storage system 1102 may provide storage services for the switch device 902/SAN fabric 902a that is directly coupled to each of the host devices 806a-806b and the storage system 1102 in order to, for example, allow the host devices 806a-806b to discover the storage system 1102, allow the host devices 806a-806b to store data in the storage system 1102, and/or perform any other storage services that would be apparent to one of skill in the art in possession of the present disclosure.

Similarly, with reference to the specific example provided above with reference to FIG. 14, the DDC device 906 in the storage system 802 may provide storage services for the switch device 902/SAN fabric 902a that is directly coupled to each of the host devices 806a-806b and the storage system 802 in order to, for example, allow the host devices 806a-806b to discover the storage system 802, allow the host devices 806a-806b to store data in the storage system 802, and/or perform any other storage services that would be apparent to one of skill in the art in possession of the present disclosure. In addition, the DDC device 1402a in the storage system 1402 may provide storage services for the switch device 902/SAN fabric 902a that is directly coupled to each of the host devices 806a-806b and the storage system 1402 in order to, for example, allow the host devices 806a-806b to discover the storage system 1402, allow the host devices 806a-806b to store data in the storage system 1402, and/or perform any other storage services that would be apparent to one of skill in the art in possession of the present disclosure. As discussed above, in some embodiments, the storage services performed at block 1502 may include the CDC device 1404 in the management fabric 1202 aggregating discovery information retrieved via discovery storage services performed by each of the DDC devices 906 and 1402a and provide a single point of management of the SAN 1400/SAN fabric 900.

The method 1500 then proceeds to block 1504 where the storage system provides second storage services to a second storage fabric provided by a second switch device directly connected to the storage system and second host devices. In an embodiment, at block 1504, the DDC device in any of the storage systems discussed above may provide storage services to a second storage fabric provided by a switch device that is directly connected to that storage system and host devices. For example, storage services provided by the DDC device in any of the storage systems discussed above may include discovery storage services, data storage services, and/or any other storage services that one of skill in the art in possession of the present disclosure would recognize as conventionally being performed by the second storage fabric. With reference to the specific example provided above with reference to FIGS. 9A/9B or FIG. 12, the DDC device 906 in the storage system 802 may provide storage services for the switch device 904/SAN fabric 904a that is directly coupled to each of the host device(s) 806c and the storage system 802 in order to, for example, allow the host device(s) 806c to discover the storage system 802, allow the host device(s) 806c to store data in the storage system 802, and/or perform any other storage services that would be apparent to one of skill in the art in possession of the present disclosure.

Similarly, with reference to the specific example provided above with reference to FIGS. 11A and 11B, the DDC device 906 in the storage system 802 may provide storage services for the switch device 904/SAN fabric 904a that is directly coupled to each of the host device(s) 806c and the storage system 802 in order to, for example, allow the host device(s) 806c to discover the storage system 802, allow the host device(s) 806c to store data in the storage system 802, and/or perform any other storage services that would be apparent to one of skill in the art in possession of the present disclosure. In addition, the DDC device 1102a in the storage system 1102 may provide storage services for the switch device 904/SAN fabric 904a that is directly coupled to each of the host device(s) 806c and the storage system 1102 in order to, for example, allow the host device(s) 806c to discover the storage system 1102, allow the host device(s) 806c to store data in the storage system 1102, and/or perform any other storage services that would be apparent to one of skill in the art in possession of the present disclosure.

Similarly as well, with reference to the specific example provided above with reference to FIG. 14, the DDC device 906 in the storage system 802 may provide storage services for the switch device 904/SAN fabric 904a that is directly coupled to each of the host device(s) 806c and the storage system 802 in order to, for example, allow the host device(s) 806c to discover the storage system 802, allow the host device(s) 806c to store data in the storage system 802, and/or perform any other storage services that would be apparent to one of skill in the art in possession of the present disclosure. In addition, the DDC device 1402a in the storage system 1402 may provide storage services for the switch device 904/SAN fabric 904a that is directly coupled to each of the host device(s) 806c and the storage system 1402 in order to, for example, allow the host device(s) 806c to discover the storage system 1402, allow the host device(s) 806c to store data in the storage system 1402, and/or perform any other storage services that would be apparent to one of skill in the art in possession of the present disclosure. As discussed above, in some embodiments, the storage services performed at block 1504 may include the CDC device 1404 in the management fabric 1202 aggregating discovery information retrieved via discovery storage services performed by each of the DDC devices 906 and 1402a and provide a single point of management of the SAN 1400/SAN fabric 900.

The method 1500 then proceeds to block 1506 where the first storage fabric transmits storage data traffic between the storage system and the first host devices using the first switch device. In an embodiment, at block 1506, the first storage fabric directly connected to any storage system discussed above may transmit storage data traffic between that storage system and its directly connected host devices. With reference to the specific example provided above with reference to FIGS. 9A/9B or FIG. 12, the switch device 902/SAN fabric 902*a* that is directly coupled to each of the host devices 806*a*-806*b* and the storage system 802 may transmit storage data traffic between any of those host devices 806*a*-806*b* and the storage system 802.

Similarly, with reference to the specific example provided above with reference to FIGS. 11A and 11B, the switch device 902/SAN fabric 902*a* that is directly coupled to each of the host devices 806*a*-806*b* and the storage system 802 may transmit storage data traffic between any of those host devices 806*a*-806*b* and the storage system 802. In addition, the switch device 902/SAN fabric 902*a* that is directly coupled to each of the host devices 806*a*-806*b* and the storage system 1102 may transmit storage data traffic between any of those host devices 806*a*-806*b* and the storage system 1102. Similarly, with reference to the specific example provided above with reference to FIG. 14, the switch device 902/SAN fabric 902*a* that is directly coupled to each of the host devices 806*a*-806*b* and the storage system 802 may transmit storage data traffic between any of those host devices 806*a*-806*b* and the storage system 802. In addition, the switch device 902/SAN fabric 902*a* that is directly coupled to each of the host devices 806*a*-806*b* and the storage system 1402 may transmit storage data traffic between any of those host devices 806*a*-806*b* and the storage system 1402.

The method 1500 then proceeds to block 1508 where the second storage fabric transmits storage data traffic between the storage system and the second host devices using the second switch device. In an embodiment, at block 1508, the second storage fabric directly connected to any storage system discussed above may transmit storage data traffic between that storage system and its directly connected host devices. With reference to the specific example provided above with reference to FIGS. 9A/9B or FIG. 12, the switch device 904/SAN fabric 904*a* that is directly coupled to each of the host device(s) 806*c* and the storage system 802 may transmit storage data traffic between any of those host device(s) 806*c* and the storage system 802.

Similarly, with reference to the specific example provided above with reference to FIGS. 11A and 11B, the switch device 904/SAN fabric 904*a* that is directly coupled to each of the host device(s) 806*c* and the storage system 802 may transmit storage data traffic between any of those host device(s) 806*c* and the storage system 802. In addition, the switch device 904/SAN fabric 904*a* that is directly coupled to each of the host device(s) 806*c* and the storage system 1102 may transmit storage data traffic between any of those host device(s) 806*c* and the storage system 1102. Similarly, with reference to the specific example provided above with reference to FIG. 14, the switch device 904/SAN fabric 904*a* that is directly coupled to each of the host device(s) 806*c* and the storage system 802 may transmit storage data traffic between any of those host device(s) 806*c* and the storage system 802. In addition, the switch device 904/SAN fabric 904*a* that is directly coupled to each of the host device(s) 806*c* and the storage system 1402 may transmit storage data traffic between any of those host device(s) 806*c* and the storage system 1402.

Finally, with reference to the specific examples provided above with reference to FIGS. 12 and 14 and at any time during the method 1500, the management device(s) 1206 in the management fabric 1202 may perform management operations on the switch device 902 and/or 904 via the control switch device 1204*a* and/or 1204*b*. Furthermore, with reference to FIG. 14, management operations may include the use of discovery information aggregated by the CDC device 1404 in the management fabric 1202 as discussed above. In a specific example, in the event something goes wrong with one of the switch devices 902 or 904, a network administrator or other user may use the management device(s) 1206 to perform management operations such, as troubleshooting that switch device (e.g., to identify an unavailable port on a switch device) via the management fabric 1202.

Thus, systems and methods have been described that provide multiple independent SAN fabrics in an NVME/TCP SAN in order to address several issues present in conventional SANs. For example, the multiple independent storage fabric SAN system of the present disclosure may include a storage system including NVMe storage devices. A first storage fabric includes a first switch device that is directly connected to the storage system, and first host devices that are directly connected to the first switch device and each configured to transmit NVMe/TCP storage data traffic via the first switch device with NVMe storage devices in the storage system. A second storage fabric is independent from the first storage fabric and includes a second switch device that is directly connected to the storage system and that is not configured to transmit storage data traffic with the first switch device, and second host devices that are directly connected to the second switch device and each configured to transmit NVMe/TCP storage data traffic via the second switch device with NVMe storage devices in the storage system. The storage system is configured to provide first storage services to each of the first storage fabric and the second storage fabric. As such, congestion issues, latency issues, cabling issues, and expense issues associated with conventional SANs are reduced or eliminated Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multiple independent storage fabric Storage Area Network (SAN) system, comprising:
    a first storage system;
    a first storage fabric that includes:
        a first switch device that is directly connected to the first storage system; and
        a plurality of first host devices that are only directly connected to the first switch device in the first storage fabric to enable each of the plurality of first host devices to access to all of the storage subsystems in the first storage system, wherein each of the plurality of first host devices are only capable of transmitting storage data traffic with the first storage system via the first switch device in the first storage fabric;
    a second storage fabric that is independent from the first storage fabric and that includes:
        a second switch device that is directly connected to the first storage system and that is not configured to transmit storage data traffic with the first switch device in the first storage fabric; and a plurality of second host devices that are only directly connected to the second switch device in the second storage fabric to enable each of the plurality of second host devices to access to all of the storage subsystems in the first storage system, wherein each of the plurality of second host devices are only capable of transmitting storage data traffic with the first storage system via the second switch device in the second storage fabric, wherein the first storage system is configured to provide first storage services to each of the first storage fabric and the second storage fabric.

2. The system of claim 1, wherein the storage subsystems in the first storage system include a plurality of Non-Volatile Memory express (NVMe) storage devices that are configured to utilize NVMe/Transmission Control Protocol (TCP).

3. The system of claim 2, wherein each of the plurality of first host devices are directly connected to the first switch device in the first storage fabric via electrical conductor cabling, and wherein each of the plurality of second host devices are directly connected to the second switch device in the second storage fabric via electrical conductor cabling.

4. The system of claim 1, further comprising:
a management fabric that includes:
a control switch device that is connected to each of the first switch device and the second switch device; and
a management device that is configured to perform management operations on the first switch device and the second switch device via the control switch device.

5. The system of claim 1, wherein the first storage system includes a Direct Discovery Controller (DDC) device that is configured to provide discovery storage services to each of the first storage fabric and the second storage fabric.

6. The system of claim 1, further comprising:
a second storage system,
wherein the first switch device is directly connected to the second storage system to enable each of the plurality of first host devices to access to all of the storage subsystems in the second storage system, wherein each of the plurality of first host devices are only capable of transmitting storage data traffic with the second storage system via the first switch device in the first storage fabric,
wherein the second switch device is directly connected to the second storage system to enable each of the plurality of second host devices to access to all of the storage subsystems in the second storage system, wherein each of the plurality of second host devices are only capable of transmitting storage data traffic with the second storage system via the second switch device in the second storage fabric; and
wherein the second storage system is configured to provide second storage services to each of the first storage fabric and the second storage fabric.

7. The system of claim 6, wherein the first storage system includes a first Direct Discovery Controller (DDC) device that is configured to provide first discovery storage services to each of the first storage fabric and the second storage fabric, wherein the second storage system includes a second DDC device that is configured to provide second discovery storage services to each of the first storage fabric and the second storage fabric, and wherein the system includes:
a management fabric for the first switch device and the second switch device that includes a Centralized Discovery Controller (CDC) device that is configured to aggregate discovery information retrieved via the first discovery storage services and the second discovery storage services.

8. An Information Handling System (IHS), comprising:
a chassis;
a plurality of storage devices that are housed in the chassis;
a communication system that is included on the chassis and that is configured to:
directly connect to a first switch device that is directly connected to a plurality of first host devices to provide a first storage fabric that enables each of the plurality of first host devices to access to all of the storage devices, wherein each of the plurality of first host devices are only directly connected to the first switch device in the first storage fabric and are only capable of transmitting storage data traffic with the communication system via the first switch device in the first storage fabric; and
directly connect to a second switch device that is not configured to transmit storage data traffic with the first switch device, and that is directly connected to a plurality of second host devices to provide a second storage fabric that is independent from the first storage fabric and that enables each of the plurality of second host devices to access to all of the storage devices, wherein each of the plurality of second host devices are only directly connected to the second switch device in the second storage fabric and are only capable of transmitting storage data traffic with the communication system via the second switch device in the second storage fabric;
a processing system that is included in the chassis and coupled to each of the communication system and the plurality of storage devices; and
a memory system that is included in the chassis, coupled to the processing system, and that includes instructions that, when executed by the processing system, cause the processing system to provide a storage engine that is configured to:
transmit storage data traffic associated with the plurality of storage devices via the first switch device with each of the plurality of first host devices;
transmit storage data traffic associated with the plurality of storage devices via the second switch device with each of the plurality of second host devices; and
provide storage services to each of the first storage fabric and the second storage fabric.

9. The IHS of claim 8, wherein the plurality of storage devices each include a Non-Volatile Memory express (NVMe) storage device that is configured to utilize NVMe/Transmission Control Protocol (TCP).

10. The IHS of claim 8, wherein each of the plurality of first host devices are directly connected to the first switch device in the first storage fabric via electrical conductor cabling, and wherein each of the plurality of second host devices are directly connected to the second switch device in the second storage fabric via electrical conductor cabling.

11. The IHS of claim 8, wherein the storage engine is included in a Direct Discovery Controller (DDC) device and is configured to provide discovery storage services to each of the first storage fabric and the second storage fabric.

12. The IHS of claim 8, wherein the transmission of storage data traffic associated with the plurality of storage devices with each of the plurality of first host devices is performed using a single processing system and queueing system included in the first switch device.

13. The IHS of claim 8, wherein the transmission of storage data traffic associated with the plurality of storage devices with each of the plurality of second host devices is performed using a single processing system and queueing system included in the second switch device.

14. A method for providing multiple independent storage fabrics in a Storage Area Network (SAN), comprising:

transmitting, by a first storage fabric between a first storage system and a plurality of first host devices using a first switch device that is directly connected to each of the first storage system and the plurality of first host devices in order to provide the first storage fabric that enables each of the plurality of first host devices to access to all of the storage subsystems in the first storage system, storage data traffic, wherein each of the plurality of first host devices are only directly connected to the first switch device in the first storage fabric and are only capable of transmitting the storage data traffic with the first storage system via the first switch device in the first storage fabric;

transmitting, by a second storage fabric between the first storage system and a plurality of second host devices using a second switch device that is directly connected to each of the first storage system and the plurality of second host devices and that is not configured to transmit storage data traffic with the first switch device in order to provide the second storage fabric that is independent from the first storage fabric and that enables each of the plurality of second host devices to access to all of the storage subsystems in the first storage system, storage data traffic, wherein each of the plurality of second host devices are only directly connected to the second switch device in the second storage fabric and are only capable of transmitting the storage data traffic with the first storage system via the second switch device in the second storage fabric; and providing, by the first storage system, first storage services to each of the first storage fabric and the second storage fabric.

15. The method of claim 14, wherein the storage subsystems in the first storage system includes a plurality of Non-Volatile Memory express (NVMe) storage devices that are configured to utilize NVMe/Transmission Control Protocol (TCP).

16. The method of claim 14, wherein each of the plurality of first host devices are directly connected to the first switch device in the first storage fabric via electrical conductor cabling, and wherein each of the plurality of second host devices are directly connected to the second switch device in the second storage fabric via electrical conductor cabling.

17. The method of claim 14, further comprising:

performing, by a management device that is coupled to the first switch device and the second switch device via a control switch device in order to provide a management fabric, management operations on the first switch device and the second switch device via the control switch device.

18. The method of claim 14, wherein the first storage system includes a Direct Discovery Controller (DDC) device that provides discovery storage services to each of the first storage fabric and the second storage fabric.

19. The method of claim 14, further comprising:

transmitting, by the first storage fabric between a second storage system and the plurality of first host devices using the first switch device that is directly connected to each of the second storage system and the plurality of first host devices in order to provide the first storage fabric that enables each of the plurality of first host devices to access to all of the storage subsystems in the second storage system, storage data traffic, wherein each of the plurality of first host devices are only capable of transmitting the storage data traffic with the second storage system via the first switch device in the first storage fabric;

transmitting, by the second storage fabric between the second storage system and the plurality of second host devices using the second switch device that is directly connected to each of the second storage system and the plurality of second host devices and that is not configured to transmit storage data traffic with the first switch device in order to provide the second storage fabric that is independent from the first storage fabric and that enables each of the plurality of second host devices to access to all of the storage subsystems in the second storage system, storage data traffic, wherein each of the plurality of second host devices are only capable of transmitting the storage data traffic with the second storage system via the second switch device in the second storage fabric; and providing, by the second storage system, second storage services to each of the first storage fabric and the second storage fabric.

20. The method of claim 14, further comprising:

wherein the first storage system includes a first Direct Discovery Controller (DDC) device that provides first discovery storage services to each of the first storage fabric and the second storage fabric, wherein the second storage system includes a second DDC device that provides second discovery storage services to each of the first storage fabric and the second storage fabric, and wherein the method includes:

aggregating, by a Centralized Discovery Controller (CDC) device in a management fabric for the first switch device and the second switch device, discovery information retrieved via the first discovery storage services and the second discovery storage services.

* * * * *